United States Patent
Lei et al.

(10) Patent No.: US 11,432,324 B2
(45) Date of Patent: Aug. 30, 2022

(54) FALLBACK PROCEDURES FOR TWO-STEP RANDOM ACCESS PROCEDURES

(71) Applicant: QUALCOMM Incorporated, San Diego, CA (US)

(72) Inventors: Jing Lei, San Diego, CA (US); Linhai He, San Diego, CA (US); Hung Dinh Ly, San Diego, CA (US); Seyong Park, San Diego, CA (US); Naga Bhushan, San Diego, CA (US); Ying Wang, San Diego, CA (US); Wanshi Chen, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 16/778,956

(22) Filed: Jan. 31, 2020

(65) Prior Publication Data

US 2020/0260485 A1    Aug. 13, 2020

Related U.S. Application Data

(60) Provisional application No. 62/803,288, filed on Feb. 8, 2019.

(51) Int. Cl.
*H04W 74/08* (2009.01)
*H04W 72/14* (2009.01)
(Continued)

(52) U.S. Cl.
CPC ....... *H04W 74/0808* (2013.01); *H04L 1/1819* (2013.01); *H04L 5/0051* (2013.01);
(Continued)

(58) Field of Classification Search
CPC .... H04W 74/08; H04W 72/14; H04L 1/1819; H04L 5/0051; H04L 5/0055; H04L 5/10
See application file for complete search history.

(56) References Cited

U.S. PATENT DOCUMENTS

6,388,997 B1    5/2002 Scott
2015/0099501 A1    4/2015 Kim et al.
(Continued)

OTHER PUBLICATIONS

LG Electronics, "2-step RACH procedure for NR-U" 3GPP R2-1818098, 3GPP TSG-RAN WG2 #103bis Spokane, USA Nov. 12-16, 2018, 4 pages (Year: 2018).*

(Continued)

*Primary Examiner* — Kent Krueger
(74) *Attorney, Agent, or Firm* — Holland & Hart LLP; Nerrie M. Zohn

(57) ABSTRACT

Fallback procedures for user equipments (UEs) are described that provide efficient fallback to a four-step random access procedure from a two-step random access procedure. For example, after transmitting a first message of a two-step random access procedure, a UE may start a fallback timer or counter and monitor for a second message of the two-step random access procedure for the duration of the fallback timer or counter. At the expiration of the fallback timer or counter, the UE may fall back to a four-step random access procedure. In some cases, the UE may transmit multiple repetitions of the first message and monitor for responses after transmitting the repetitions or after each repetition. Additionally or alternatively, the base station may transmit an explicit signal to the UE that may signal to the UE to perform a fallback procedure at a beginning or middle of a random access procedure.

64 Claims, 15 Drawing Sheets

(51) Int. Cl.
| | |
|---|---|
| *H04W 76/27* | (2018.01) |
| *H04L 1/18* | (2006.01) |
| *H04L 5/00* | (2006.01) |
| *H04L 5/10* | (2006.01) |
| *H04W 24/08* | (2009.01) |
| *H04W 80/02* | (2009.01) |

(52) U.S. Cl.
CPC .............. *H04L 5/0055* (2013.01); *H04L 5/10* (2013.01); *H04W 24/08* (2013.01); *H04W 72/14* (2013.01); *H04W 76/27* (2018.02); *H04W 80/02* (2013.01)

(56) References Cited

U.S. PATENT DOCUMENTS

| | | | |
|---|---|---|---|
| 2015/0282120 A1 | 10/2015 | Liao | |
| 2019/0132887 A1 | 5/2019 | Zhou et al. | |
| 2019/0357267 A1* | 11/2019 | Martin | H04W 74/0833 |
| 2020/0107322 A1* | 4/2020 | Lunttila | H04W 72/0453 |
| 2020/0107372 A1* | 4/2020 | Agiwal | H04W 72/14 |
| 2020/0146069 A1* | 5/2020 | Chen | H04B 17/327 |
| 2020/0221504 A1* | 7/2020 | Cirik | H04W 74/0833 |
| 2021/0168792 A1* | 6/2021 | Agiwal | H04W 74/004 |
| 2021/0219349 A1* | 7/2021 | Huang | H04W 74/008 |

OTHER PUBLICATIONS

International Search Report and Written Opinion—PCT/US2020/016426—ISA/EPO—dated Jun. 26, 2020.
Mediatek Inc: "2-step RACH msgA and msgB contents", 3GPP Draft, R2-1816685, 3GPP TSG-RAN WG2 Meeting #104, 2-step RACH msgA and msgB contents, 3rd Generation Partnership Project (3GPP), Mobile Competence Center, 650, Route Des Lucioles, F-06921 Sophia-Antipolis Cedex, France, vol. RAN WG2, No. Spokane, US, 20181112-20181116, Nov. 12, 2018 (Nov. 12, 2018), XP051556254, 7 pages Retrieved from the Internet: URL:http://www.3gpp.org/ftp/Meetings%5F3GPP%5FSYNC/RAN2/Docs/R2%2D1816685%2Ezip. [retrieved on Nov. 12, 2018] section 2.1; p. 2.
Partial International Search Report—PCT/US2020/016426—ISA/EPO—dated Apr. 21, 2020.
Vivo: "RAN2 Impacts of 2-step RACH", 3GPP Draft, 3GPP TSG-RAN WG2 Meeting #103bis, R2-1814263, RAN2 Impacts of 2-step RACH, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 12, 2018, Sep. 28, 2018 (Sep. 28, 2018), XP051523715, 3 pages, Retrieved from the Internet: URL:http://www.3gpp.org/ftp/tsg%5Fran/WG2%5FRL2/TSGR2%5F103bis/Docs/R2%2D1814263%2Ezip , [retrieved on Sep. 28, 2018], figure 1, p. 2, lines 22-43.
ZTE Corporation, et al., "Msg2 Payload Contents for 2-step RACH", 3GPP Draft, 3GPP TSG-RAN WG2 Meeting#104, R2-1817064_R2-1814034, Msg2 Payload Contents for 2-step RACH, 3rd Generation Partnership Project (3GPP), Mobile Competence Centre, 650, Route Des Lucioles, F-06921 Sophia-Anti Polls Cedex, France, vol. RAN WG2, No. Chengdu. China, Nov. 12, 2018-Nov. 16, 2018, Nov. 2, 2018 (Nov. 2, 2018), XP051480988, 9 Pages, Retrieved from the Internet: URL:http://www.3gpp.org/ftp/tsg%5Fran/WG2%5FRL2/TSGR2%5F104/Docs/R2%2D1817064%2Ezip [retrieved on Sep. 27, 2018], Fall back from 2-step to 4-step RACH, receiving a RAR with RAPID as the fallback indicator, paragraph [0002]—paragraph [0003],
Shirvanimoghaddam et al., "Massive Non-Orthogonal Multiple Access for Cellular IoT: Potentials and Limitations", University of Newcastle, published Dec. 2, 2016, 7 pgs.

\* cited by examiner

FALLBACK PROCEDURES FOR TWO-STEP RANDOM ACCESS PROCEDURES

CROSS REFERENCE

The present Application for Patent claims the benefit of U.S. Provisional Patent Application No. 62/803,288 by LEI et al., entitled "FALLBACK PROCEDURES FOR TWO-STEP RANDOM ACCESS PROCEDURES," filed Feb. 8, 2019, assigned to the assignee hereof, and expressly incorporated by reference herein in its entirety.

BACKGROUND

The following relates generally to wireless communications, and more specifically to fallback procedures for two-step random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as UEs. Some wireless communications systems may support one or more random access procedures for communication between a UE and a base station, including an initial access to a channel, a connection re-establishment, a handover procedure, or synchronization on the channel. The random access procedures may involve a series of handshake messages exchanged between the UE and the base station. Random access procedures may be contention-based using a shared pool of resources and preamble sequences, or non-contention based where a UE may transmit one or more messages based on a reserved preamble sequence or set of resources. In some implementations (such as unlicensed spectrum band operations), the UE may perform channel sensing (such as a listen-before-talk (LBT) procedure) before transmitting one or more messages on available resources of the channel, as part of the exchange.

As demand for communication access increases, a wireless communications system may support methods for reducing the number of handshake messages exchanged between a UE and a base station. For example, where a typical four-step random access procedure may involve a UE sending a data payload in a third message of the four-step random access procedure, in a two-step random access procedure a UE may send a data payload in a first message of the two-step random access procedure. The reduced handshaking for random access procedures may minimize potential delays for channel access, particularly for contention-based procedures. However, in some cases, reliability of transmission for the data payload may be impacted.

SUMMARY

The described techniques relate to improved methods, systems, devices, and apparatuses that support fallback procedures for two-step random access procedures. In the two-step random access procedure, the user equipment (UE) may transmit to the base station a single random access message. In some cases, the single random access message may include a preamble and a data payload, which may be transmitted in contiguous or non-contiguous resources. In response to the random access message, the base station may transmit to the UE a single response message, such as a random access response message. In some cases, if one message of the random access procedure is not correctly received, the random access procedure may fail (e.g., due to the deterministic relationship, and timings for, one message to the next in the random access procedure).

As compared to four messages of a four-step random access procedure, for example, the random access response message of the two-step random access procedure may combine all or a portion of multiple messages of the four-step random access procedure into two messages. For example, the random access response message may include an acknowledgement that the random access response message was successfully received and decoded. The random access response message may indicate to the UE that the base station successfully received all or a portion of the random access message. If, however, the base station does not detect the random access preamble, or a listen-before-talk (LBT) procedure is unsuccessful, the base station may not transmit the random access response message.

According to the techniques described herein, the UE may be configured to utilize a fallback procedure to efficiently fall back to a four-step random access procedure from a two-step random access procedure. For example, upon (e.g., after) transmitting a first message of the two-step random access procedure (e.g., a random access message), the UE may start a fallback timer and monitor for a second message of the two-step random access procedure (e.g., a random access response message) for the duration of the fallback timer. At the expiration of the fallback timer, the UE may fall back to the four-step random access procedure. In some cases, the UE may transmit multiple repetitions of the first message of the two-step random access procedure and monitor for responses after transmitting the repetitions or after each repetition (including, e.g., using hybrid automatic repeat request (HARQ) for the repetitions). In some cases, the UE may incrementally increase a transmit power and/or transmit the preamble using a new preamble sequence for a number of attempts (e.g., until reaching a configured number of attempts) before falling back to the four-step random access procedure. Additionally or alternatively, the base station may transmit an explicit signal to the UE that may configure and/or signal the UE to perform a fallback procedure. In some cases, the UE may determine based on channel measurements or other criteria not to perform the two-step random access procedure and immediately fall back to the four-step random access procedure.

A method of wireless communication at a UE is described. The method may include transmitting a first message of a two-step random access procedure to a base station, the first message including a preamble sequence and a data payload, monitoring for a second message of the two-step random access procedure from the base station, and transmitting a third message (e.g., as a random access message) of a four-step random access procedure to the base station if the UE determines based on the monitoring that the base station has not successfully received at least a portion of the first message.

An apparatus for wireless communication at a UE is described. The apparatus may include a processor, memory in electronic communication with the processor, and instructions stored in the memory. The instructions may be executable by the processor to cause the apparatus to transmit a first message of a two-step random access procedure to a base station, the first message including a preamble sequence and a data payload, monitor for a second message of the two-step random access procedure from the base station, and transmit a third message (e.g., as a random access message) of a four-step random access procedure to the base station if the UE determines based on the monitoring that the base station has not successfully received at least a portion of the first message.

Another apparatus for wireless communication at a UE is described. The apparatus may include means for transmitting a first message of a two-step random access procedure to a base station, the first message including a preamble sequence and a data payload, monitoring for a second message of the two-step random access procedure from the base station, and transmitting a third message (e.g., as a random access message) of a four-step random access procedure to the base station if the UE determines based on the monitoring that the base station has not successfully received at least a portion of the first message.

A non-transitory computer-readable medium storing code for wireless communication at a UE is described. The code may include instructions executable by a processor to transmit a first message of a two-step random access procedure to a base station, the first message including a preamble sequence and a data payload, monitor for a second message of the two-step random access procedure from the base station, and transmit a third message (e.g., as a random access message) of a four-step random access procedure to the base station if the UE determines based on the monitoring that the base station has not successfully received at least a portion of the first message.

Some examples of the method, apparatuses, and non-transitory computer-readable medium described herein may further include operations, features, means, or instructions for receiving, based on the monitoring, the second message of the two-step random access procedure from the base station, the second message including an acknowledgement of the preamble sequence, and where the transmitting the third message of the four-step random access procedure includes transmitting a physical uplink shared channel (PUSCH) transmission including the data payload in response to receiving the second message of the two-step random access procedure from the base station. Some examples of the method, apparatuses, and non-transitory computer-readable medium described herein may further include operations, features, means, or instructions for receiving, based on the monitoring, the second message of the two-step random access procedure from the base station, the second message including at least one of a negative acknowledgement of the data payload, a fallback command, an uplink grant for the third message of the four-step random access procedure, or a combination thereof, and where the transmitting the third message of the four-step random access procedure includes transmitting a PUSCH transmission including the data payload in response to receiving the second message of the two-step random access procedure from the base station.

Some examples of the method, apparatuses, and non-transitory computer-readable medium described herein may further include operations, features, means, or instructions for receiving a fallback command indicating that the UE may be to terminate or suspend the two-step random access procedure, and where the transmitting the third message of the four-step random access procedure includes transmitting the third message based on the fallback command.

In some examples of the method, apparatuses, and non-transitory computer-readable medium described herein, the fallback command may be received via one or more of downlink control information (DCI), group-common DCI, one or more medium access control (MAC) control elements (CEs), or a combination thereof.

Some examples of the method, apparatuses, and non-transitory computer-readable medium described herein may further include operations, features, means, or instructions for identifying, from a set of fallback indicators in the fallback command, a fallback indicator of whether the UE may be to terminate or suspend the two-step random access procedure based on a type of the data payload. In some examples of the method, apparatuses, and non-transitory computer-readable medium described herein, the fallback command indicates a number of retransmissions of the first message of the two-step random access procedure prior to terminating or suspending the two-step random access procedure. In some examples of the method, apparatuses, and non-transitory computer-readable medium described herein, the fallback command indicates a set of non-contention resources and a transmission scheme for the transmitting the third message of the four-step random access procedure.

Some examples of the method, apparatuses, and non-transitory computer-readable medium described herein may further include operations, features, means, or instructions for starting a fallback timer upon transmitting the first message of the two-step random access procedure, where the monitoring includes monitoring for the second message of the two-step random access procedure based on the fallback timer, and where the transmitting the third message of the four-step random access procedure includes transmitting the third message if the UE determines that the base station may have not successfully received the at least the portion of the first message before an expiration of the fallback timer.

Some examples of the method, apparatuses, and non-transitory computer-readable medium described herein may further include operations, features, means, or instructions for receiving signaling indicating at least a duration of the fallback timer, where the signaling is system information, one or more radio resource control (RRC) messages, or both. In some examples of the method, apparatuses, and non-transitory computer-readable medium described herein, the duration of the fallback timer may be based on an associated quality of service, a traffic load, an RRC configuration state, a size of the data payload of the first message, or a combination thereof.

In some examples of the method, apparatuses, and non-transitory computer-readable medium described herein, the transmitting the first message includes transmitting one or more repetitions of the first message of the two-step random access procedure, and the transmitting the third message of the four-step random access procedure includes transmitting the third message if the UE determines that the base station may have not successfully received the at least the portion of the one or more of the repetitions of the first message.

Some examples of the method, apparatuses, and non-transitory computer-readable medium described herein may further include operations, features, means, or instructions for starting a fallback timer for the UE to monitor for the second message of the two-step random access procedure, where the monitoring includes monitoring for the second message of the two-step random access procedure for a duration of the fallback timer, and where the transmitting the third message of the four-step random access procedure includes transmitting the third message if the UE determines that the base station may have not successfully received the at least the portion of the one or more repetitions of the first message before an expiration of the fallback timer.

In some examples of the method, apparatuses, and non-transitory computer-readable medium described herein, the starting the fallback timer may include operations, features, means, or instructions for starting the fallback timer upon transmitting a last repetition of the one or more repetitions of the first message. In some examples of the method, apparatuses, and non-transitory computer-readable medium described herein, the starting the fallback timer may include operations, features, means, or instructions for starting the fallback timer upon transmitting a first repetition of the one or more repetitions of the first message.

In some examples of the method, apparatuses, and non-transitory computer-readable medium described herein, at least one of the repetitions of the first message of the two-step random access procedure may be transmitted with a different transmit power, preamble sequence, resource mapping, or a combination thereof, from at least one other of the repetitions of the first message of the two-step random access procedure. Some examples of the method, apparatuses, and non-transitory computer-readable medium described herein may further include operations, features, means, or instructions for receiving signaling indicating a repetition configuration for the repetitions of the first message of the two-step random access procedure, the repetition configuration indicating a repetition periodicity for periodic repetitions, a repetition pattern for aperiodic repetitions, a resource assignment for one or more of the repetitions, or a combination thereof.

In some examples of the method, apparatuses, and non-transitory computer-readable medium described herein, the monitoring may include operations, features, means, or instructions for monitoring for the second message of the two-step random access procedure after transmitting each of the repetitions of the first message of the two-step random access procedure.

In some examples of the method, apparatuses, and non-transitory computer-readable medium described herein, the transmitting the one or more repetitions of the first message of the two-step random access procedure may include operations, features, means, or instructions for transmitting incremental redundancy information associated with the data payload.

Some examples of the method, apparatuses, and non-transitory computer-readable medium described herein may further include operations, features, means, or instructions for receiving signaling indicating a HARQ configuration for the repetitions of the first message of the two-step random access procedure, the HARQ configuration indicating a modulation and coding scheme (MCS) for the repetitions, preamble sequences for one or more of the repetitions, a transmit power for one or more of the repetitions, a resource assignment for one or more of the repetitions, or a combination thereof.

Some examples of the method, apparatuses, and non-transitory computer-readable medium described herein may further include operations, features, means, or instructions for updating a counter upon transmitting each of the one or more repetitions of the first message of the two-step random access procedure, and where the transmitting the third message of the four-step random access procedure includes transmitting the third message if the UE determines that it did not successfully receive the second message of the two-step random access procedure before the counter satisfies a threshold.

In some examples of the method, apparatuses, and non-transitory computer-readable medium described herein, the transmitting the third message of the four-step random access procedure may include operations, features, means, or instructions for transmitting the third message if the UE determines that it did not successfully receive the second message of the two-step random access procedure after retransmitting the first message of the two-step random access procedure using a maximum transmit power, using a maximum number of different preamble sequences, or a combination thereof.

Some examples of the method, apparatuses, and non-transitory computer-readable medium described herein may further include operations, features, means, or instructions for determining whether to transmit the first message of the two-step random access procedure based on a signal quality measurement, a signal quality target, an offset value associated with UE overloading, a RRC state of the UE, a size of the data payload to be transmitted in the first message, an MCS associated with the first message, an estimated transmit power for a retransmission of the first message, or any combination thereof.

Some examples of the method, apparatuses, and non-transitory computer-readable medium described herein may further include operations, features, means, or instructions for identifying a set of occasions associated with the two-step random access procedure, and selecting one or more occasions of the set of occasions for transmitting the first message of the two-step random access procedure based on a size of the data payload and respective sizes of each of the set of occasions.

In some examples of the method, apparatuses, and non-transitory computer-readable medium described herein, the first message of the two-step random access procedure includes a preamble, a PUSCH including the data payload, and a demodulation reference signal (DMRS) associated with the PUSCH. Some examples of the method, apparatuses, and non-transitory computer-readable medium described herein may further include operations, features, means, or instructions for performing a first LBT procedure prior to transmitting the preamble of the two-step random access procedure, and performing a second LBT procedure prior to transmitting the PUSCH and DMRS of the two-step random access procedure. In some examples of the method, apparatuses, and non-transitory computer-readable medium described herein, the preamble may be transmitted via a first set of frequency resources and the PUSCH and DMRS may be transmitted via a second, different set of frequency resources. In some examples of the method, apparatuses, and non-transitory computer-readable medium described herein, the preamble may be transmitted via a first beam and the PUSCH and DMRS may be transmitted via a second, different beam

DETAILED DESCRIPTION

Figure 1:
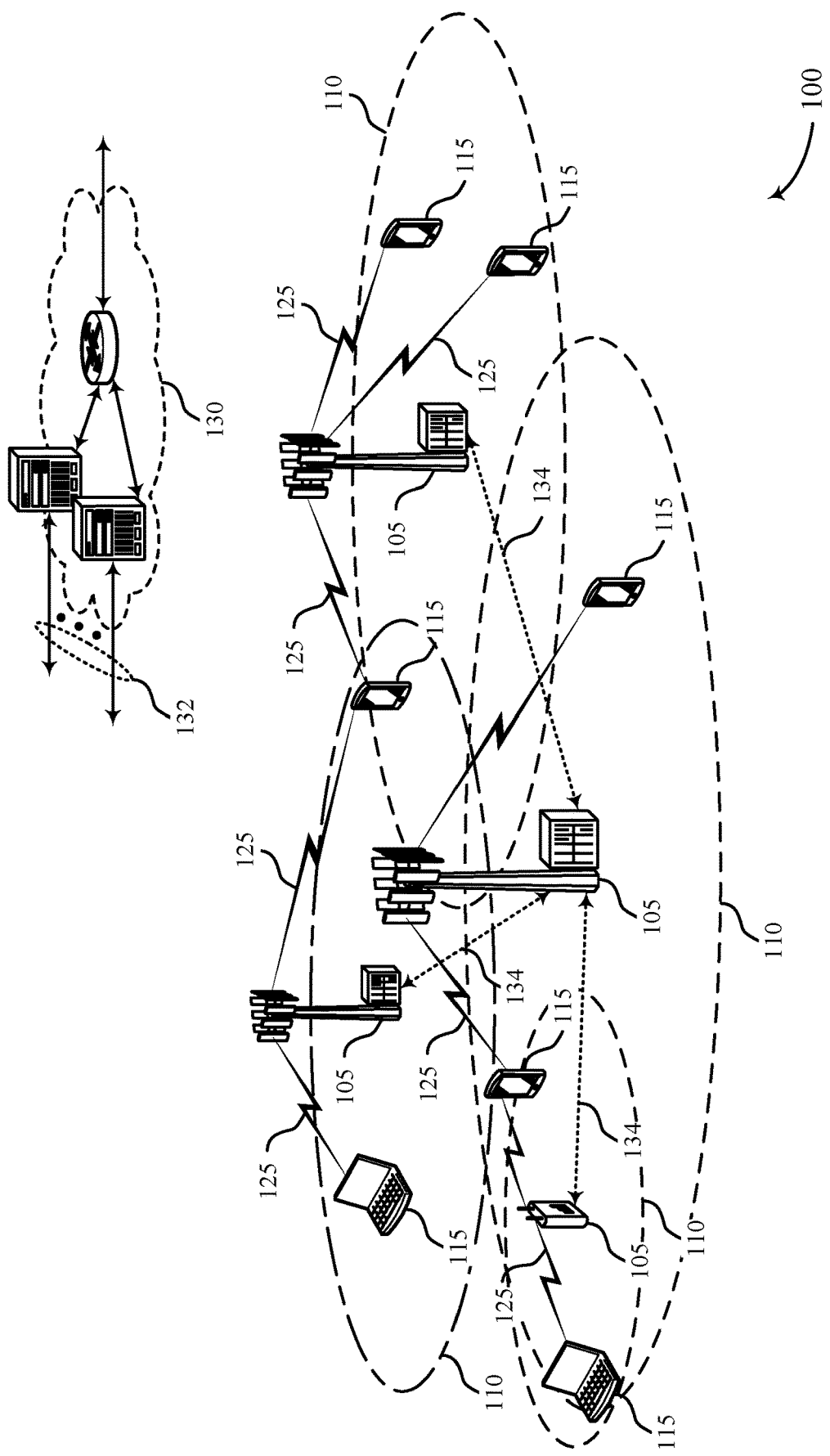
FIG. 1 illustrates an example of a wireless communications system that supports fallback procedures for two-step random access procedures in accordance with aspects of the present disclosure.

The present disclosure describes techniques for fallback procedures for two-step random access procedures. A user equipment (UE) may perform a random access procedure (e.g., a random access channel (RACH) procedure) with a base station to access a wireless network, for example, when initially accessing the wireless network, during a handover, or when reconnecting or resynchronizing with the base station. In some cases, a random access procedure may be performed as a four-step random access procedure. The four-step random access procedure may, for example, include a random access request message, a random access response message, a radio resource control (RRC) message, and/or a contention resolution message. In some cases, these messages may include, or be referred to as, Msg1, Msg2, Msg3, and Msg4, respectively. Each of the messages of the four-step random access procedure may be communicated using corresponding sets of resources (e.g., corresponding sets of time, frequency, and/or spatial resources).

According to the four-step random access procedure, the UE may transmit to the base station a first message (e.g., Msg1), for example, a random access request message. In response, the base station may transmit to the UE a second message (e.g., Msg2), for example, a random access response message. The second message may include a grant of uplink resources for the UE to transmit to the base station a third message, for example, an RRC message (e.g., Msg3) requesting a new or reconfigured connection with the base station. In some cases, the four-step random access procedure may include the base station transmitting to the UE a fourth message, for example, a contention resolution message (e.g., Msg4), or other downlink signaling, such as an RRC message, to confirm the requested new or reconfigured connection. After successfully performing the random access procedure, the UE and the base station may establish a data connection to communicate subsequent transmissions of data and other communications. That is, the UE and the base station may establish an RRC configuration for the data connection, and the base station may allocate resources (e.g., time, frequency, and/or spatial resources) for uplink control transmissions such as scheduling requests. After the random access procedure, the UE may be in a connected state with the base station.

In some cases, the UE and the base station may perform the four-step random access procedure while operating in a shared or unlicensed radio frequency spectrum bandwidth. In some cases, other communications devices (e.g., other UEs, base stations, etc.) in the relatively nearby vicinity may also send transmissions using resources of the shared radio frequency spectrum bandwidth (the resources, e.g., at least partially overlapping a set of resources to be used for the four-step random access procedure). In such cases, communications to and/or from the other devices on overlapping time, frequency, and space resources of the shared radio frequency spectrum band may collide with the messages communicated between the UE and the base station for the four-step random access procedure.

In some cases, if one message of the random access procedure is not correctly received, the random access procedure may fail (e.g., due to the deterministic relationship, and timings for, one message to the next in the random access procedure). For example, if the random access response message collides with another transmission from another device in the vicinity of the UE or the base station (the other device transmitting using the same or an overlapping set of resources), the UE may not correctly receive the random access response message including the grant for the first set of uplink resources on which to transmit the RRC message to the base station. In this case, the random access procedure fails, and the UE and the base station may restart a new random access procedure, for example, from the first message (e.g., via a new random access request message). In this way, for example, one message collision may cause a failure to successfully complete a random access procedure including one uplink grant in the random access response message, which may result in inefficient resource utilization and/or communications delays (e.g., a delay in obtaining access to a network).

In some cases, before establishing a connection for communications on the shared radio frequency spectrum band, the UE and/or the base station may utilize a channel access procedure (e.g., an LBT procedure) to determine whether the time and frequency resources for the channel are available, which may prevent interference or collisions with another random access message, multi-user interference, another UE communicating with another base station, higher priority transmissions (e.g., radar), and the like. For example, before one or more of the messages of a random access procedure, the UE and/or the base station may perform an LBT procedure to contend for access to the shared radio frequency spectrum band.

In some cases, as an alternative to a four-step random access procedure, the UE may be configured to perform a two-step random access procedure. For example, the UE may use the two-step random access procedure when an amount of data to be transferred is below a threshold amount of data. In a two-step random access procedure, the UE and the base station may exchange relatively fewer messages than in a four-step random access procedure (e.g., two messages versus four messages). In the two-step random access procedure, the UE may transmit to the base station a single random access message (e.g., MsgA). In response to the random access message, the base station may transmit to the UE a single response message, such as a random access response message (e.g., MsgB).

As compared to the four messages of a four-step random access procedure, for example, a random access message (e.g., a first message of the two-step random access procedure) may combine all or a portion of the Msg1 and the Msg3 of the four-step random access procedure. The UE may transmit the random access message of the two-step random access procedure to the base station on, for example, a physical random access channel (PRACH), a physical uplink shared channel (PUSCH), or using other configured resources. The random access message may include a preamble and a data payload. In some cases, the UE may transmit the preamble and the data payload using different numerologies (e.g., different transmission waveform characteristics, such as subcarrier spacing, cyclic prefix size, etc.), different sets of transmission resources (e.g., time, frequency, and/or spatial resources), different portions of a carrier, different bandwidth parts, using different power control schemes (e.g., using different transmit powers), and/or different sampling rates.

In the two-step random access procedure, before transmitting the preamble of the random access message, the UE may perform an LBT procedure to determine whether a set of resources is available for transmission (e.g., a set of time, frequency, and/or spatial resources). If the LBT procedure is successful, the UE may transmit the preamble of the random access message to the base station. The set of resources for which the UE performed the LBT procedure may be a different set of resources than the set of resources with which the UE is to transmit the data payload. Additionally, the set of resources used to transmit the preamble may be associated with a different numerology (e.g., a different subcarrier spacing) than the set of resources used to transmit the data payload. Thus, after transmitting the preamble, the UE may perform a second LBT procedure during a tuning gap to ascertain that the set of resources for transmitting the data payload is available for transmission.

In the two-step random access procedure, if the base station successfully receives the random access message (e.g., preamble and data payload), the base station may also perform an LBT procedure for transmitting to the UE 115-*a* the random access response message of the two-step random access procedure (e.g., the second message of the two-step random access procedure). The random access response message of the two-step random access procedure may combine all or a portion of the Msg2 and the Msg4 of the four-step random access procedure. If the LBT procedure is successful, the base station may transmit the random access response message to the UE using, for example, a physical downlink control channel (PDCCH) and/or a physical downlink shared channel (PDSCH). For example, the base station may transmit control information using the PDCCH including a grant for the PDSCH, and the PDSCH payload may include data of the random access response message. For example, the random access response message may include an acknowledgement that the random access message was successfully received and decoded, a scheduling grant indicating a set of resources for the UE 115-*a* to use to transmit a further data transmission, a network identifier (e.g., a cell radio network temporary identifier (C-RNTI)) for subsequent communication with the UE, and like information. The random access response message may indicate to the UE that the base station successfully received all or a portion of the random access message. If, however, the base station does not detect the random access preamble, or the LBT procedure is unsuccessful, the base station may not transmit the random access response message.

After successfully performing the random access procedure, the UE and the base station may or may not establish a data connection for subsequent transmissions of data and other communications. Accordingly, in the two-step random access procedure, relative to the four-step random access procedure, the UE may be capable of transmitting data (e.g., the data payload) to the base station without transitioning to a connected state for data transmission. Accordingly, a successful two-step random access procedure may provide, for example, relatively improved latency and faster connection speeds than a successful four-step random access procedure, especially in the case of relatively small data payloads or intermittent data.

According to the techniques described herein, the UE may be configured to utilize a fallback procedure to efficiently fall back to a four-step random access procedure from a two-step random access procedure. For example, upon (e.g., after) transmitting a first message of the two-step random access procedure (e.g., the random access message), the UE may start a fallback timer and monitor for a second message of the two-step random access procedure (e.g., the random access response message) for the duration of the fallback timer. At the expiration of the fallback timer, the UE may fall back to the four-step random access procedure.

In some cases, the UE may transmit multiple repetitions of the random access message and monitor for responses after transmitting the repetitions or after each repetition (including, e.g., using HARQ for the repetitions). In some cases, the UE may incrementally increase a transmit power and/or transmit the preamble using a new preamble sequence for a number of attempts (e.g., until reaching a configured number of attempts) before falling back to the four-step random access procedure. In some cases, the base station may transmit an explicit signal to the UE that may configure and/or signal the UE to perform a fallback procedure. In some cases, the UE may determine based on channel measurements or other criteria not to perform the two-step random access procedure and immediately fall back to the four-step random access procedure.

In some cases, the base station may correctly receive and decode only a portion of the random access message, for example, the preamble but not the payload of the random access message. In such cases, the base station may indicate to the UE that the base station successfully received and decoded the preamble and not the payload. In some cases, the base station may transmit an uplink grant for a set of resources to be used to retransmit information that was not correctly received in the payload of the initial random access message of the two-step random access procedure (e.g., according to one or more of the received acknowledgement or negative acknowledgement message). Accordingly, the UE may proceed directly to transmitting the RRC message (Msg3) to the base station using the corresponding allocated resources.

FIG. 1 illustrates an example of a wireless communications system 100 that supports fallback procedures for two-step random access procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, a base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM), or discrete Fourier transform-spread-OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information (SI), etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to the techniques described herein, a UE 115 may be configured to utilize a fallback procedure to efficiently fall back to a four-step random access procedure from a two-step random access procedure. For example, the UE may transmit a random access message, and the UE 115 may start a fallback timer and monitor for the random access response message for the duration of the fallback timer. At the expiration of the fallback timer, the UE 115 may fall back to the four-step random access procedure. In some cases, the UE 115 may transmit multiple repetitions of the random access message and monitor for responses after transmitting the repetitions or after each repetition.

Figure 2:
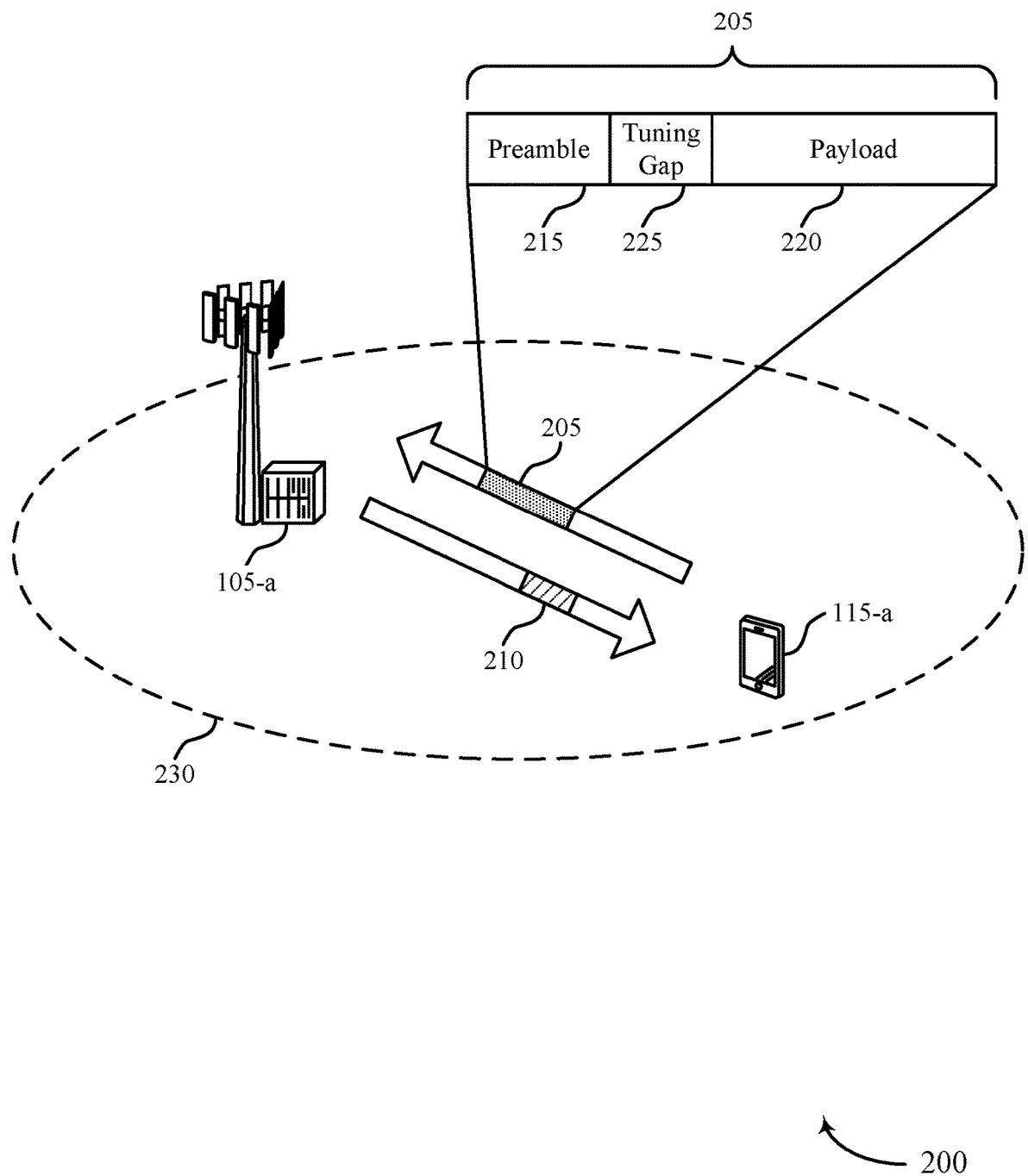
FIG. 2 illustrates an example of wireless communications system that supports fallback procedures for two-step random access procedures in accordance with aspects of the present disclosure.

FIG. 2 illustrates an example of a wireless communications system 200 that supports fallback procedures for two-step random access procedures in accordance with aspects of the present disclosure. In some examples, the wireless communications system 200 may implement aspects of the wireless communications system 100 as described with reference to FIG. 1. The wireless communications system 200 includes a base station 105-a and a UE 115-a, which may be examples of the corresponding devices as described with reference to FIG. 1.

In some cases, the UE 115-a may perform a connection procedure (e.g., a random access procedure such as a RACH procedure) to establish a connection with the base station 105-a. For example, the UE 115-a may perform a random access procedure, such as a two-step and/or a four-step random access procedure (e.g., a two-step RACH procedure and/or a four-step RACH procedure), to establish a connection to be used to communicate uplink or downlink data transmissions.

In a four-step random access procedure, the UE 115-a may transmit to the base station 105-a a first message (e.g., a random access preamble, in some cases referred to as "Msg1"). In response, the base station 105-a may transmit to the UE 115-a a second message (e.g., a random access response message, in some cases referred to as "Msg2"). The second message may include a grant of uplink resources for the UE 115-a to transmit to the base station 105-a a third message (e.g., an RRC message, in some cases referred to as a "Msg3") requesting a new or reconfigured connection with the base station 105-a. In some cases, the random access procedure may include the base station 105-a transmitting to the UE 115-a a fourth message (e.g., a contention resolution message or connection complete message, in some cases referred to as a "Msg4"), or other downlink signaling, such as an RRC message, to confirm the requested new or reconfigured connection. After successfully performing the random access procedure, the UE 115-a and the base station 105-a may establish a data connection to communicate subsequent transmissions of data and other communications. That is, the UE 115-a and the base station 105-a may establish an RRC configuration (e.g., context) for the data connection, and the base station 105-a may allocate resources (e.g., physical uplink control channel (PUCCH) resources) for uplink control transmissions such as scheduling requests, channel state information (CSI) reporting, or acknowledgements. After the random access procedure, the UE 115-a may be in a connected state (e.g., RRC connected state) with the base station 105-a.

According to various aspects, the UE 115-a may be configured to perform a two-step random access procedure. For example, the UE 115-a may use the two-step random access procedure when an amount of data to be transferred is below a threshold amount of data, or where a persistent data connection may not be desired. In a two-step random access procedure, the UE 115-a and the base station 105-a may exchange relatively fewer messages than in a four-step random access procedure (e.g., two messages versus four messages). In the two-step random access procedure, the UE 115-a may transmit to the base station a single random access message 205 (in some cases referred to as a "MsgA"). In response to the random access message 205, the base station 105-a may transmit to the UE 115-a a single response message, such as a random access response message 210 (in some cases referred to as a "MsgB").

As compared to the four messages of a four-step random access procedure, for example, the random access message 205 of the two-step random access procedure may combine all or a portion of the Msg1 and the Msg3 of the four-step random access procedure. The UE 115-a may transmit the random access message 205 to the base station 105-a, for example, on a PRACH, a PUSCH, or using other configured resources. The random access message 205 may include a preamble 215 and a data payload 220. In some cases, the UE 115-a may transmit the preamble 215 and the data payload 220 using different numerologies (e.g., different transmission waveform characteristics, such as subcarrier spacing, cyclic prefix size, etc.), different sets of transmission resources (e.g., time, frequency, and/or spatial resources), different portions of a carrier, different bandwidth parts, using different power control schemes (e.g., using different transmit powers), and/or different sampling rates.

The preamble 215 (in some cases referred to a RACH preamble, or PRACH preamble) may be a sequence from a group of predefined sequences. The preamble 215 may indicate to the base station 105-a the presence of a random access attempt and allow the base station 105-a to determine a delay (such as a timing delay) between the base station 105-a and the UE 115-a. The preamble of the random access message 205 may, in some cases, be defined by a preamble sequence and a cyclic prefix. A preamble sequence may be defined based in part on a Zadoff-Chu sequence. The UE 115-a may additionally, or alternatively, use a guard period to handle timing uncertainty of the random access message 205 transmission. For example, before beginning the random access procedure, the UE 115-a may obtain downlink synchronization with the base station 105-a based in part on a cell-search procedure. However, because the UE 115-a has not yet obtained uplink synchronization with the base station 105-a, there may be an uncertainty in uplink timing due to the location of the UE 115-a in the cell (such as geographic coverage area of base station 105-a) not being known. In some cases, the uncertainty in uplink timing may be based in part on a dimension (e.g., size and/or area) of the cell.

A number of preamble sequences (e.g., 64 preamble sequences) may be defined for a cell. The UE 115-a may select a preamble sequence from a set of sequences in a cell (e.g., geographic coverage area 230 of the base station 105-a). The UE 115-a may identify the plurality of preamble sequences from system information, for example, broadcasted by the base station 105-a, from which the UE 115-a may select (e.g., randomly) the particular preamble sequence to transmit. The UE 115-a may further transmit the data payload 220 in the random access message 205. The data payload 220 may include uplink data intended for communication to the base station 105-a. In some cases, the UE 115-a may also transmit with the data payload 220 one or more reference signals, for example, to be used for demodulation (e.g., a demodulation reference signal (DMRS)), or other like purposes. In some cases, the UE 115-a may select the preamble sequence for the preamble 215 based on an amount of data that the UE 115-a is to transmit in the data payload 220. In some cases (e.g., if the UE 115-a indicates that the UE 115-a has additional data to transmit that is not included in the payload 220), the base station may determine an allocation of resources (e.g., time, frequency, and/or spatial resources) to be granted to the UE 115-a.

In some cases, the UE 115-a and the base station 105-a may operate in a shared or unlicensed radio frequency spectrum bandwidth. In some such cases, before establishing and initiating communications, the UE 115-a and/or the base station 105-a may utilize a channel access procedure to determine whether the time and frequency resources for the channel are available, which may prevent interference and collisions with communications between another UE 115 and the base station 105-a, another UE 115 and another base station 105, higher priority transmissions (e.g., radar), and the like. For example, there may be different categories of LBT procedures, including category 1 (CAT1) LBT (e.g., no LBT), category 2 (CAT2) LBT (e.g., LBT including one-time channel sensing for a fixed period without a back-off period), category 3 (CAT3) LBT (e.g., LBT with a random (or other) back-off period and a fixed sized contention window), and category 4 (CAT4) LBT (e.g., LBT with a random (or other) back-off period and a variable sized contention window). In some cases, before one or more (e.g., each) of the messages of the random access procedure, the UE 115-a and/or the base station 105-a may perform an opportunistic contention-based channel access procedure (e.g., an LBT) procedure, such as a CAT1, CAT2, or CAT4 LBT procedure, etc.) to contend for access to the transmission medium or channel. In some cases, the UE 115-a may perform a directional LBT procedure in multiple transmission direction, for example, for communications systems using directional communications (e.g., mmW communications systems).

For example, before transmitting the preamble 215 of the random access message 205, the UE 115-a may perform an LBT procedure to ascertain that a set of resources is available for transmission (e.g., a set of time, frequency, and/or spatial resources). If the LBT procedure is successful, the UE 115-a may transmit the preamble 215 of the random access message 205 to the base station 105-a. However, as described above, the UE 115-a may transmit the preamble 215 and the data payload 220 using different numerologies, different portions of a carrier, different bandwidth parts, using different power control schemes and/or different sampling rates. In such cases, the set of resources for which the UE 115-a performed the LBT procedure may be a different set of resources than the set of resources with which the UE 115-a is to transmit the data payload 220. Additionally, the set of resources used to transmit the preamble 215 may be associated with a different numerology (e.g., a different subcarrier spacing) than the set of resources used to transmit the data payload 220. Thus, after transmitting the preamble 215, the UE 115-a may perform a second LBT procedure during a tuning gap 225 to ascertain that the set of resources for transmitting the data payload 220 is available for transmission. Moreover, some wireless communications systems may define intervals at which LBT procedures are to be performed, and the UE 115-a may accordingly perform this defined LBT procedure in the tuning gap 225.

Similarly, if the base station 105-a successfully receives the random access message 205, the base station 105-a may also perform an LBT procedure for transmitting to the UE 115-a the random access response message 210 of the two-step random access procedure. As compared to the four messages of a four-step random access procedure, for example, the random access response message 210 of the two-step random access procedure may combine all or a portion of the Msg2 and the Msg4 of the four-step random access procedure. If the LBT procedure is successful, the base station 105-a may transmit the random access response message 210 to the UE 115-a using, for example, a PDCCH and/or a PDSCH. For example, the base station 105-a may transmit control information using the PDCCH including a grant for the PDSCH, and the PDSCH payload may include data of the random access response message 210. For example, the random access response message 210 may include an acknowledgement that the random access response message 210 was successfully received and decoded, a scheduling grant indicating a set of resources for the UE 115-a to use to transmit a further data transmission, a network identifier (e.g., a C-RNTI) for subsequent communication with the UE 115-a, and like information. The random access response message 210 may indicate to the UE 115-a that the base station 105-a successfully received all or a portion of the random access message 205. If, however, the base station 105-a does not detect the random access preamble, or the LBT procedure is unsuccessful, the base station 105-a may not transmit the random access response message 210.

After successfully performing the random access procedure, the UE 115-a and the base station 105-a may or may not establish a data connection for subsequent transmissions of data and other communications. Accordingly, in the two-step random access procedure, relative to the four-step random access procedure, the UE 115-a may be capable of transmitting data (such as the data payload 220) to the base station 105-a without transitioning to a connected state for data transmission. Accordingly, a successful two-step random access procedure may provide, for example, relatively improved latency and faster connection speeds than a successful four-step random access procedure.

Because the UE 115-a is not in a connected state with the base station 105-a prior to transmitting the two-step random access procedure and has not received a grant for an uplink shared channel, the UE 115-a may not have a set of orthogonal resources (e.g., UE-specific time-frequency or code resources) for transmission of the data payload 220. In some cases, the UE 115-a may transmit the data payload 220 in resources associated with grant-free transmissions. Two-step random access procedures may adapt relatively more slowly (e.g., as compared to four-step random access procedures) for a quality of service (QoS) associated with the communications. For example, a large size for the data payload 220 may increase the probability of collision, and so on. In addition, transmit power and timing for the data payload may be controlled using open loop operations, which may degrade the performance for transfer of the data payload 220. Thus, in some cases re-trying or continuing to pursue a two-step random access procedure may incur additional latency.

As such, while the base station 105-*a* monitors the PUSCH for the preamble 215 and/or the payload 220 of the random access message 205, in some cases, the base station 105-*a* may not successfully receive the preamble 215 and/or the payload 220 in contention-based communications. For example, the base station 105-*a* may fail to decode the preamble 215 and/or the payload 220 of the random access message 205 due to a collision and/or interference with communications between another UE 115 and the base station 105-*a* (e.g., another random access message, multi-user interference, another UE 115 communicating with another base station 105, higher priority transmissions (e.g., radar), and the like. Similarly, the base station 105-*a* may fail to decode all or a portion of the random access message 205 due to poor channel conditions, signal attenuation, or a physical blockage (e.g., a hand or object blocking a directional transmit beam). In these situations, the two-step random access procedure may fail.

For example, the base station 105-*a* may receive and detect the preamble 215 included in the random access message 205 but fail to receive or decode the PUSCH transmission carrying the payload 220. In this case, the base station 105-*a* may transmit a signal (e.g., included in the random access response message 210, or in other signaling) to the UE 115-*a* indicating that the base station 105-*a* did not correctly decode the data payload 220 of the random access message 205. Alternatively, the base station 105-*a* may fail to receive or decode the preamble 215 (or the entire random access message 205), in which case the base station 105-*a* may not have information that would identify or indicate the occurrence of the failed transmission, and the base station 105-*a* may not transmit signaling to the UE 115-*a*. According to various aspects, the UE 115-*a* may be configured to fall back to a four-step random access procedure (e.g., not attempting further two-step random access procedure transmissions), and in the four-step random access procedure, the UE 115-*a* may transmit the data payload 220 using dedicated grant-based resources.

That is, in some cases, following a failed two-step random access procedure, a four-step random access procedure may provide additional signaling to correct for the conditions that caused the two-step random access procedure to fail. For example, the four-step random access procedure may include signaling to increase a transmit power and/or a timing advance before transmitting the data payload 220. In some cases, four-step random access procedures may, for example, relatively quickly account for a QoS associated with the communications in cases of an unexpected and/or large increase in latency, a large size for the data payload 220 increasing the probability of collision, degraded signal conditions, and the like. Further, in some cases, four-step random access procedures may support relatively more (e.g., all) possible RRC states with a variety of available time, frequency, and/or spatial resources.

According to the techniques described herein, the UE 115-*a* may be configured to utilize a fallback procedure to efficiently fall back to a four-step random access procedure from a two-step random access procedure. For example, upon (e.g., after) transmitting the random access message 205, the UE 115-*a* may start a fallback timer and monitor for the random access response message 210 for the duration of the fallback timer. At the expiration of the fallback timer, the UE 115-*a* may fall back to the four-step random access procedure. In some cases, the UE 115-*a* may transmit multiple repetitions of the random access message 205 and monitor for responses after transmitting the repetitions or after each repetition (including, e.g., using HARQ for the repetitions). In some cases, the UE 115-*a* may incrementally increase a transmit power and/or transmit the preamble 215 using a new preamble sequence for a number of attempts (e.g., until reaching a configured number of attempts) before falling back to the four-step random access procedure. Additionally or alternatively, the base station 105-*a* may transmit an explicit signal to the UE 115-*a* that may configure and/or signal the UE 115-*a* to perform a fallback procedure. In some cases, the UE 115-*a* may determine based on channel measurements or other criteria not to perform the two-step random access procedure and immediately fall back to the four-step random access procedure.

Figure 3:
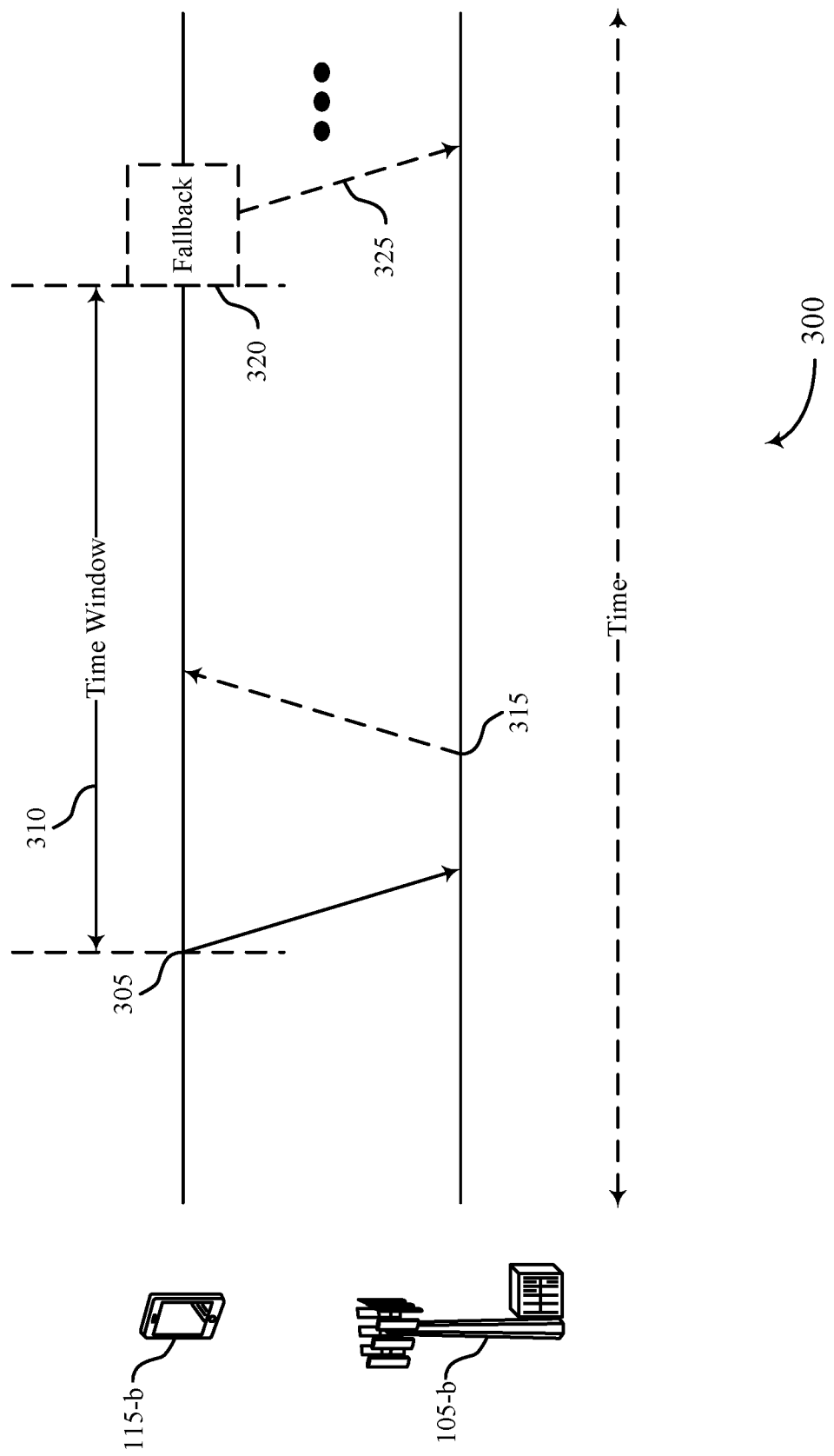
FIG. 3 illustrates an example of a transmission timeline that supports fallback procedures for two-step random access procedures in accordance with aspects of the present disclosure.

FIG. 3 illustrates an example transmission timeline 300 that supports fallback procedures for two-step random access procedures in accordance with aspects of the present disclosure. The transmission timeline 300 illustrates a transmission scheme for communications in a wireless communications system operating in the shared radio frequency spectrum, which may be implemented by aspects of the wireless communications system 100 and the wireless communications system 200 as described with reference to FIGS. 1 and 2, respectively. The transmission timeline 300 shows example communications between a base station 105-*b* and a UE 115-*b*, which may be examples of the corresponding devices as described with reference to FIGS. 1 and 2. The transmission timeline 300 illustrates an example transmission scheme in which the UE 115-*b* utilizes a fallback timer to perform a fallback procedure to fall back from a two-step random access procedure to a four-step random access procedure.

In FIG. 3, the UE 115-*b* initiates a two-step random access procedure to communicate a data payload. At 305, the UE 115-*b* may transmit to the base station 105-*b* a first message of the two-step random access procedure, for example, a random access message. As described herein, the random access message may include a preamble and a data payload (whereas in, e.g., a four-step random access procedure, the UE 115-*b* may transmit the preamble in an initial random access request message, and transmit the payload in a third message, such as an RRC message, after receiving a grant from the base station 105-*b* in response to the random access request message). That is, the payload may include contents or aspects equivalent to a connectivity request as well as an RRC message of a four-step random access procedure (e.g., Msg1 and Msg3 of the four-step random access procedure), and may additionally include application data (e.g., user-plane data). In some cases, the preamble and the payload may be transmitted on partially overlapping or non-overlapping sets of resources (e.g., different sets of time, frequency, and/or spatial resources). Additionally, the set of resources used to transmit the preamble may be associated with a different numerology (e.g., a different subcarrier spacing) than the set of resources used to transmit the data payload. Additionally or alternatively, the preamble may be transmitted via a different beam than the payload. For example, the preamble may not be beamformed while the payload may be transmitted via a beam (e.g., corresponding to a selected beam of a set of synchronization signal blocks).

In some cases, the UE 115-*b* may start a fallback timer to monitor for a response to the transmitted random access message. The fallback timer may be configured with a time window 310, where the UE 115-*b* may monitor for the response to the random access message for the duration (e.g., a length given by a parameter $T_w$) of the time window 310. As the transmission timeline 300 shows, the UE 115-*b* may start the fallback timer substantially simultaneously with transmitting the random access message, but it is also contemplated that the UE 115-*b* may start the fallback timer at a time before or after transmitting the random access message.

In some cases, the duration of the time window 310 given by the time window parameter $T_w$, may be configured by prior signaling via the base station 105-*b*. For example, the base station 105-*b* may indicate to the UE 115-*b* the time window parameter $T_w$, in SI, such as in a system information block (SIB), or other similar configuration signaling (e.g., in a master information block (MIB), remaining system information (RMSI), etc.). In some cases, the base station 105-*b* may determine the time window parameter $T_w$, based on a QoS associated with the communications between the UE 115-*b* and the base station 105-*b*, a traffic load of communications with the base station 105-*b* (e.g., communications with the UE 115-*b* and/or other devices in the vicinity), an RRC state of the UE 115-*b* (e.g., whether the UE 115-*b* is in an RRC connected state), and/or a size of the payload that the UE 115-*b* is to transmit in the random access message. For example, in cases in which the traffic load is relatively high or the payload is relatively large, the probability of a collision may be relatively higher. Thus, in the case shown by transmission timeline 300 in which the UE 115-*b* transmits one random access message at 305, the base station 105-*b* may determine and configure the time window parameter $T_w$, to be relatively shorter given the higher likelihood that the random access message will not be successfully received. This may, for example, conserve time resources in cases in which the base station does not correctly receive, or is not able to correctly decode, the preamble and/or the data payload of the random access message.

In some cases, the base station 105-*b* may successfully receive at least a portion of the random access message and attempt to decode the included data payload. If the base station 105-*b* successfully receives the preamble and the data payload of the random access message, the base station 105-*b* may use the preamble to identify the UE 115-*b* and to accordingly decode the payload. In response to successfully decoding the random access message, the base station 105-*b* may transmit a random access response message to the UE 115-*b* at 315. In the random access response message, the base station 105-*b* may, for example, transmit control information using a PDCCH (including, e.g., a grant for a PDSCH), and information for the UE 115-*b* in the PDSCH. The random access response message may include contents or aspects equivalent to a random access response message and/or a contention resolution message of a four-step random access procedure (e.g., Msg2 and Msg4 of the four-step random access procedure). For example, the random access response message may include an acknowledgement that the random access response message was successfully received and decoded. In some cases, the random access response message may further a network identifier (e.g., a C-RNTI) for subsequent communication with the UE 115-*b*, a timing advance, or like information.

In some cases, the random access response message may include a scheduling grant indicating a set of resources for the UE 115-*b* to use to transmit a further data transmission. That is, in a case in which the UE 115-*b* has a large amount of data to transmit, the UE 115-*b* may transmit portions of the total amount of data in separate payloads. In this case, the base station 105-*b* may allocate resources for the second portion of the data (and any further subsequent portions). The UE 115-*b* may then, for example, transition from an idle state to a connected state and transmit the remaining data using the allocated resources. If the UE 115-*b* successfully receives the random access response message, the UE may acknowledge the random access response message and the procedure may end. The UE 115-*b* may remain in an idle mode until a subsequent transmission (e.g., performing the procedure again at that time).

Alternatively, in some cases, the base station 105-*b* may fail to receive and/or decode the preamble and/or the payload of the random access message. For example, the base station 105-*b* may receive the preamble transmission but may fail to receive the payload due to, for example, signaling delay associated with contention on the channel (due to, e.g., a failed LBT procedure, interference, a collision, etc.) If the base station 105-*b* does not detect the random access preamble (or, e.g., the base station 105-*b* is not able to successfully perform a corresponding LBT procedure), the base station 105-*b* may not transmit the random access response message to the UE 115-*b*.

Further, in some cases, the base station 105-*b* may transmit the random access response message to the UE 115-*b* to indicate successful reception of the random access message, but the UE 115-*b* may not successfully receive the random access response message. That is, the base station 105-*b* may successfully receive and decode the random access message received from the UE 115-*b* and successfully perform an LBT procedure to gain access to the medium to transmit the random access response message. The base station 105-*b* may transmit the random access response message to the UE 115-*b* at 315. However, because the spectrum is shared and not reserved, it is possible that the random access response message collides with other transmissions between devices in the vicinity of the base station 105-*b* and the UE 115-*b* (and/or the random access response message is not successfully communicated to the UE 115-*b* due to other dynamic interference and signal conditions, as described herein).

If the UE 115-*b* does not receive the random access response message by the end of the time window 310 corresponding to the fallback timer, the UE 115-*b* may perform a fallback procedure. If, for example, the base station 105-*b* does not successfully receive and/or decode the entirety of the random access response message, the base station 105-*b* may not have information that would identify or indicate the random access response message, and thus the base station 105-*b* may not transmit the random access response message to the UE 115-*b*. Alternatively, even if the base station 105-*b* successfully receives and decodes the entirety of the random access response message, and the base station 105-*b* transmits the random access response message to the UE 115-*b* at 315, the random access response message may encounter a collision or other interference such that the UE 115-*b* does not receive the random access response message. In either case, at 320, following the expiration of the time window 310 corresponding to the fallback timer, the UE 115-*b* may accordingly identify that it has not received the random access response message and determine to perform a fallback procedure.

In the fallback procedure at 320, the UE 115-*b* may fall back to a four-step random access procedure (e.g., rather than further attempting one or more subsequent two-step random access procedures) to establish the connection for communications with the base station 105-*b*. In some cases, the UE 115-*b* may be more likely to successfully perform the four-step random access procedure than a further two-step random access procedure. For example, because the random access message of the two-step random access procedure includes both the preamble and the payload, it may be substantially larger than a random access request message (e.g., Msg1) of the four-step random access procedure, and thus more likely to encounter a collision. Further, in the four-step random access procedure, the information of the data payload may be transmitted using scheduled resources rather than the contention-based resources used in the two-step random access procedure, thus being substantially less likely to encounter a collision, for example, in a crowded environment (e.g., an environment in which many devices are communicating transmissions in the vicinity of the UE 115-b and the base station 105-b).

In this way, at 325, the UE 115-b may transmit the first message of the four-step random access procedure, for example, a random access request message (Msg1), to the base station 105-b. In some cases, the UE 115-b may perform an LBT procedure to ascertain that a set of resources is available for transmission (e.g., time, frequency, and/or spatial resources allocated for RACH and/or PRACH transmissions). If the LBT procedure is successful, the UE 115-b may transmit the random access request message to the base station 105-b at 325. The random access request message may be, for example, a PRACH transmission transmitted using a set of resources allocated for PRACH transmissions. In some cases, the random access request message may include a preamble, for example, similarly selected from a set of preamble sequences, such as the set of a number (e.g., 64) of preamble sequences associated with the cell.

If the random access request message (Msg1) of the four-step random access procedure is successfully communicated from the UE 115-b to the base station 105-b, the base station 105-b may transmit a random access response message (Msg2) (not shown) of the four-step random access procedure to the UE 115-b. In some cases, the base station 105-b may perform an LBT procedure before transmitting the second message of the random access procedure to the UE 115-b. If the LBT procedure is successful, the base station 105-b may transmit the random access response message to the UE 115-b using, for example, a PDCCH and a payload in a PDSCH. For example, the base station 105-b may transmit control information using the PDCCH including a grant for a PDSCH, and the PDSCH payload may include the random access response message. If the base station 105-b does not detect the random access preamble, or the LBT procedure is unsuccessful, the base station 105-b may not transmit the random access response message.

The random access response message may include, for example, an index corresponding to the detected random access preamble of the UE 115-b (e.g., an index of a detected preamble sequence, such as a random access preamble identifier (RAPID)), an uplink grant (e.g., a grant of time, frequency, and/or spatial resources using a PUSCH, a temporary cell RNTI (TC-RNTI), and other information, such as an indication of a timing advance (e.g., a timing advance group (TAG)), etc. In the time domain, the uplink grant may indicate, for example, a slot offset, a starting symbol and a duration (e.g., a length) of symbols, or the like.

The UE 115-b may receive the random access response message and may then determine whether the random access response message contains information intended for the UE 115-b (e.g., rather than information for other UEs 115 performing other respective random access procedures). For example, the UE 115-b may monitor a search space (e.g., a Type-1-Common-PDCCH search space) for the RA-RNTI corresponding to the random access request message transmitted at 325. In the payload, the UE 115-b may look for a RAPID similarly corresponding to the transmitted random access request message.

If the UE 115-b successfully receives the random access response message, the UE 115-b may perform a further LBT procedure before transmitting the third message (not shown) of the random access procedure to the base station 105-b. If the LBT procedure is successful, the UE 115-b may transmit a scheduled uplink transmission (e.g., an RRC message or Msg3) using the transmission resources associated with an uplink grant included in the random access response message intended for the UE 115-b. The RRC message may indicate a configuration for establishing a communication link, for example, including an RRC Connection Request message and an identifier of the UE 115-b (e.g., a UE-specific identifier). The RRC message may provide a configuration to then establish a communication link between the UE 115-b and the base station 105-b. The UE 115-b may scramble the RRC message with the TC-RNTI as the base station 105-b may have signaled in the random access response message intended for the UE 115-b.

In some cases, the base station 105-b may correctly receive and decode only a portion of the random access message. The base station 105-b may transmit an acknowledgement indicating the portion of the random access message that was correctly received and decoded. For example, the acknowledgement may indicate that the base station 105-b successfully received and decoded a portion of the random access message including the preamble but not the payload. In some such cases, the base station 105-b may further include a negative acknowledgement (which may alternatively be determined implicitly based on a lack of a positive acknowledgement) indicating the portion of the random access message that was not correctly received and decoded.

In the case that the base station 105-b successfully receives and decodes a portion of the random access message including, for example, the preamble but not the payload of the random access message, the base station 105-b may correspondingly indicate to the UE 115-b that the base station 105-b successfully received and decoded the preamble and not the payload (including, in some cases, negatively acknowledging the payload portion). In some such cases, the base station 105-b may additionally transmit an uplink grant for a set of resources (e.g., a grant of time, frequency, and/or spatial resources) to be used to retransmit the information that was not correctly received in the payload of the initial random access message of the two-step random access procedure (e.g., according to one or more of the received acknowledgement or negative acknowledgement message). That is, because the base station 105-b successfully received and decoded the preamble of the initial random access message of the two-step random access procedure, and the base station 105-b may have already identified the UE 115-b according to the preamble, the UE 115-b may proceed directly to transmitting the RRC message (Msg3) to the base station 105-b using the corresponding allocated resources.

In some cases, in response to decoding the RRC message (Msg3), the base station 105-b may further transmit a fourth message of the four-step random access procedure to the UE 115-b, for example, a contention resolution message (e.g., Msg4) (not shown). In some cases, the base station 105-b may perform a further LBT procedure for the fourth message. In some examples, the contention resolution message may be transmitted on the PDSCH, and may be scrambled using the same TC-RNTI used to scramble the RRC message. In some cases, the contention resolution message may include, for example, the UE identifier received in the RRC message and/or other information for contention resolution. Following the successful performance of the random access procedure, the UE 115-b and the base station 105-b may establish a communication link to communicate uplink and/or downlink transmissions, for example, based on the RRC message (e.g., according to an RRC configuration signaled in the RRC message). In some cases, the base station 105-*b* and the UE 115-*b* may establish the communication link without communicating the contention resolution message—that is, the UE 115-*b* and the base station 105-*b* may successfully complete the random access procedure and establish the communication link when the base station 105-*b* receives the RRC message.

Figure 4:
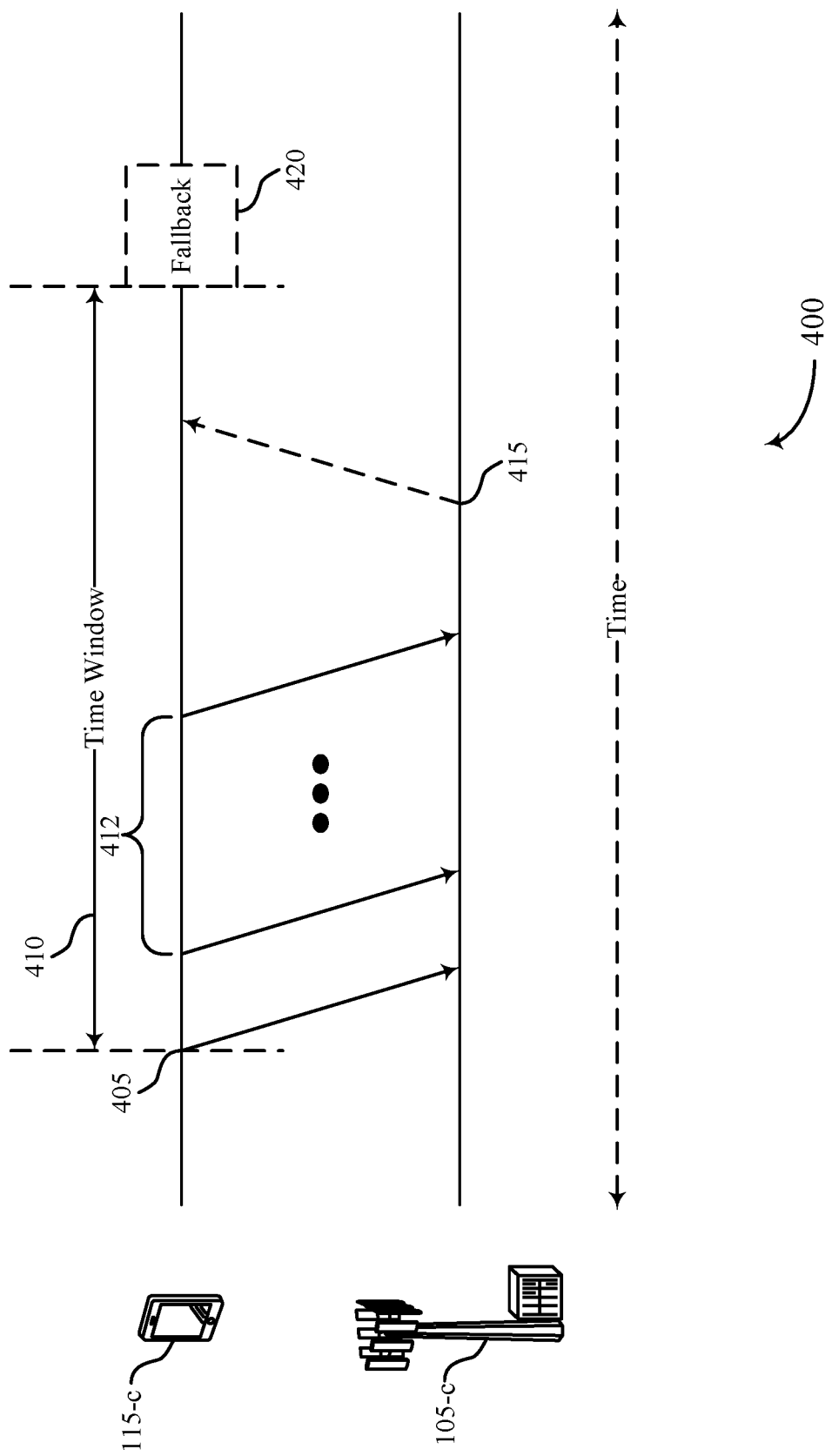
FIG. 4 illustrates an example of a transmission timeline that supports fallback procedures for two-step random access procedures in accordance with aspects of the present disclosure.

FIG. 4 illustrates an example transmission timeline 400 that supports fallback procedures for two-step random access procedures in accordance with aspects of the present disclosure. The transmission timeline 400 illustrates a transmission scheme for communications in a wireless communications system operating in the shared radio frequency spectrum, which may be implemented by aspects of the wireless communications system 100 and the wireless communications system 200 as described with reference to FIGS. 1 and 2, respectively. The transmission timeline 400 may further implement aspects of the transmission timeline 300, as described with reference to FIG. 3. The transmission timeline 400 shows example communications between a base station 105-*c* and a UE 115-*c*, which may be examples of the corresponding devices as described with reference to FIGS. 1 through 3. The transmission timeline 400 illustrates an example transmission scheme in which the UE 115-*c* transmits an initial random access message followed by one or more repetitions (e.g., retransmissions) of the random access message. The UE 115-*c* may monitor for responses after transmitting the repetitions to determine whether to perform a fallback procedure to fall back from a two-step random access procedure to a four-step random access procedure.

In FIG. 4, the UE 115-*c* initiates a two-step random access procedure to communicate a data payload. At 405, the UE 115-*c* may transmit to the base station 105-*c* a first message of the two-step random access procedure, for example, a random access message. As described herein, the random access message may include a preamble and a payload (whereas in, e.g., a four-step random access procedure, the UE 115-*c* may transmit the preamble in an initial random access request message, and transmit the payload in a third message, such as an RRC message, after receiving a grant from the base station 105-*c* in response to the random access request message). That is, the payload may include contents or aspects equivalent to a connectivity request as well as an RRC message of a four-step random access procedure (e.g., Msg1 and Msg3 of the four-step random access procedure), and may additionally include application data (e.g., user-plane data). In some cases, the preamble and the payload may be transmitted on partially overlapping or non-overlapping sets of resources (e.g., different sets of time, frequency, and/or spatial resources). Additionally, the set of resources used to transmit the preamble may be associated with a different numerology (e.g., a different subcarrier spacing) than the set of resources used to transmit the data payload.

In some cases, the UE 115-*c* may start a fallback timer to monitor for a response to the transmitted random access message. The fallback timer may be configured with a time window 410, where the UE 115-*c* may monitor for the response to the random access message for the duration (e.g., a length given by a parameter $T_w$) of the time window 410. As the transmission timeline 400 shows, the UE 115-*c* may start the fallback timer substantially simultaneously with transmitting the random access message at 405, but it is also contemplated that the UE 115-*c* may start the fallback timer at a time before or after transmitting the random access message at 405 (as is further discussed below with respect to the fallback time and the repetitions 412 of the random access response message).

As the transmission timeline 400 shows, the UE 115-*c* may transmit one or more repetitions 412 of the random access message after transmitting the initial random access message at 405. Each of the one or more repetitions 412 may include a further preamble and a further payload containing a copy of the same information or associated with the same data (e.g., redundancy information) that the UE 115-*c* included in the payload of the random access message transmitted at 405. In some cases, this redundancy information may be transmitted incrementally, for example, including different sets of bits that may be combined using a soft-combining algorithm (e.g., chase combining, incremental redundancy) or the like. In some cases, as similarly described herein, the preamble and the payload of each of the repetitions 412 may be transmitted on partially overlapping or non-overlapping sets of resources and may be associated with different numerologies.

In some cases, the initial random access message transmitted at 405 and each of the repetitions 412 may be transmitted using the same set of resources (e.g., each using the same RACH occasions, same set of frequency, and spatial resources, and corresponding time resources). Alternatively, the UE 115-*c* may transmit one or more of the initial random access message and the repetitions 412 using different sets of resources (e.g., different RACH occasions, different frequency resources, different spatial resources), according to a repetition pattern configured by a repetition configuration (e.g., one or more of the transmissions and/or repetitions 412 may use non-overlapping or partially overlapping sets of time, frequency, and spatial resources). For example, the UE 115-*c* may transmit each of the initial random access message at 405 and each of the repetitions 412 using different resources, thereby creating diversity between the transmissions, which may provide, for example, a relatively improved probability of avoiding a blockage of a particular transmit beam, a set of resources being used by other devices in the vicinity to communicate, and the like. Additionally, the set of resources used to transmit the initial random access message at 405 may be associated with a different numerology (e.g., a different subcarrier spacing) than the set of resources used to transmit the repetitions 412. Additionally, the UE 115-*c* may transmit one or more of the initial random access message at 405 and the repetitions 412 using varying (or, in other cases, not varying) transmit powers and/or preamble sequences, according to the repetition configuration. For example, the UE 115-*c* may transmit the initial random access message at 405 and the repetitions 412 using an incrementally increasing transmit power, different preamble sequences selected from a set of preamble sequences, such as the set of a number (e.g., 64) of preamble sequences associated with the cell. This may similarly provide diversity from, for example, other UEs 115 that may also be transmitting preambles to the base station 105-*c*, which may conflict with the transmissions of the UE 115-*c* (e.g., if both of the UEs 115 randomly select the same preamble sequence).

In the example transmission timeline 400 shown in FIG. 4, the base station 105-*c* may compile each of the initial random access message, as transmitted at 405, and the repetitions 412 that were successfully received. The base station 105-*c* may successfully receive multiple of these transmissions, and compare the information of the respective payloads, for example, to correct errors, determine information that may not have been correctly received and/or decoded in one or more of the transmissions, etc. In some cases, the base station 105-c may use a soft-combining algorithm (e.g., chase combining, incremental redundancy) and/or multi-user detection with successive interference cancellation (MUD-SIC) to combine the information received in each of the initial random access message and/or the repetitions 412 that is successfully received and decoded. According to the repetition configuration, the base station 105-c may receive information identifying the repetition pattern that the UE 115-c may have used to transmit the repetitions 412 (as the base station 105-c may have previously signaled the repetition configuration to the UE 115-c). After the time resources corresponding to the last of the repetitions 412, the base station 105-c may determine whether the base station 105-c received and decoded a complete (or substantially complete) version of the random access message (e.g., by aggregating each of the successfully received transmissions).

As described herein, the UE 115-c may start the fallback timer substantially simultaneously with transmitting the initial random access message at 405, as the transmission timeline 400 shows. Alternatively, the UE 115-c may start the fallback timer after transmitting the last of the repetitions 412. That is, as the base station 105-c may have identified that the base station 105-e is not to transmit a random access response message to the UE 115-c until after a last one of the repetitions 412, the base station 105-c may configure the UE 115-c to start monitoring after the time period during which the base station is not configured to transmit the random access response message (e.g., at 415, as further discussed below).

As similarly described with reference to FIG. 3, the duration of the time window 410 given by the time window parameter $T_w$, may be configured by prior signaling via the base station 105-c. Similarly, the starting point for the time window 410 may also be configured by prior signaling via the base station 105-c. For example, the base station 105-c may indicate to the UE 115-c the time window parameter $T_w$, and the starting position for the time window in SI, such as in a SIB, or other similar configuration signaling (e.g., in a master information block (MIB), remaining system information (RMSI), etc.). Further, the base station 105-c may determine and indicate to the UE 115-c the repetition pattern for each of the one or more repetitions 412. The repetition pattern may include the number of repetitions 412 (e.g., according to a parameter K defining the number of repetitions) and a resource allocation for each of the repetitions 412 (e.g., time, frequency, and/or spatial resources for each of the one or more repetitions 412). The base station 105-c may similarly signal the repetition configuration, including the repetition pattern, to the UE 115-c via in SI, such as the SIB, or other similar configuration signaling.

In some cases, the base station 105-c may determine the time window parameter $T_w$, the starting position for the time window 410, and/or the repetition pattern based on a QoS associated with the communications between the UE 115-c and the base station 105-c, a traffic load of communications with the base station 105-c (e.g., communications with the UE 115-c and/or other devices in the vicinity), an RRC state of the UE 115-c (e.g., whether the UE 115-c is in an RRC connected state), and/or a size of the payload that the UE 115-c is to transmit in the random access message. In some examples, the base station 105-c may broadcast a set of time window parameters $T_w$, associated with different combinations of, for example, QoS, RRC state, and the like. In cases in which the traffic load is relatively high or the payload is relatively large, the probability of a collision may be relatively higher. Thus, in the case shown by transmission timeline 400 in which the UE 115-c transmits the initial random access message at 405 and one or more repetitions 412, the base station 105-c may determine and configure the time window parameter $T_w$, the starting position for the time window 410, and/or the repetition pattern to increase the probability that the base station 105-c correctly receives the full amount of transmitted information (e.g., through a greater number K of repetitions 412 transmitted over more time and using different transmission resources). Alternatively, in situations in which the probability of a collision is relatively lower and/or the QoS is relatively lower, the base station 105-c may determine and configure the time window parameter $T_w$, the starting position for the time window 410, and/or the repetition pattern for a relatively lower probability that the base station 105-c correctly receives the full amount of transmitted information (e.g., through a lesser number K repetitions 412 transmitted). This may, for example, provide power savings for the UE 115-c in situations in which reliability may be relatively less important and/or collisions may be relatively less likely.

In some cases, after the base station 105-c combines each of the initial random access message and/or repetitions 412 that were successfully received and decoded, the base station 105-c may determine whether it has successfully received and decoded the information transmitted in the initial random access message transmitted at 405 and/or in the repetitions 412. In some cases, the base station 105-c may determine that all or a portion of the information transmitted in the random access message at 405 and/or the repetitions 412 was successfully received, and the base station 105-c may attempt to decode the included data payload. If the base station 105-c determines that the information received in the initial random access message and/or the repetitions 512 was successfully received and decoded, the base station 105-c may transmit the random access response message to the UE 115-c at 415. In the random access response message, the base station 105-c may, for example, transmit control information using a PDCCH (including, e.g., a grant for a PDSCH) and information for the UE 115-c in the PDSCH. The random access response message may include contents or aspects equivalent to a random access response message and/or a contention resolution message of a four-step random access procedure (e.g., Msg2 and Msg4 of the four-step random access procedure). For example, the random access response message may include an acknowledgement indicating that all or a portion of the random access response message was successfully received and decoded. In some cases, the random access response message may further include a network identifier (e.g., a C-RNTI) for subsequent communication with the UE 115-c, a timing advance, or like information.

Alternatively, in some cases, the base station 105-c may determine, after combining the successfully received information, that it failed to receive and/or decode the preamble and/or the payload of the random access message. For example, the base station 105-c may successfully receive one or more preamble transmissions, but may fail to receive all or a portion of the information of the associated data payload due to, for example, signaling delay associated with contention on the channel (due to, e.g., a failed LBT procedure, interference, a collision, etc.) If the base station 105-c does not detect the random access preamble (or, e.g., the base station 105-c is not able to successfully perform a corresponding LBT procedure), the base station 105-c may not transmit the random access response message to the UE 115-c.

Further, in some cases, the base station 105-c may transmit the random access response message to the UE 115-c to indicate successful reception of the random access message, but the UE 115-c may not successfully receive the random access response message. That is, the base station 105-c may successfully receive and decode the random access message received from the UE 115-c and successfully perform an LBT procedure to gain access to the medium to transmit the random access response message. The base station 105-c may then transmit the random access response message to the UE 115-c at 415. However, because the spectrum is shared and not reserved, it is possible that the random access response message collides with other transmissions between devices in the vicinity of the base station 105-c and the UE 115-c (and/or the random access response message is not successfully communicated to the UE 115-c due to other dynamic interference and signal conditions, as described herein).

If the UE 115-c does not receive the random access response message by the end of the time window 410 corresponding to the fallback timer, the UE 115-c may perform a fallback procedure. For example, if the base station 105-c does not successfully receive and/or decode the entirety of the random access response message, the base station 105-c may not have information that would otherwise identify or indicate the random access response message, and thus the base station 105-c may not transmit the random access response message to the UE 115-c. Alternatively, even if the base station 105-c successfully receives and decodes the entirety of the random access response message, and the base station 105-c transmits the random access response message to the UE 115-c at 415, the random access response message may encounter a collision or other interference such that the UE 115-c does not receive the random access response message. In either case, at 420, following the expiration of the time window 410 corresponding to the fallback timer, the UE 115-c may accordingly identify that it has not received the random access response message and determine to perform a fallback procedure.

In the fallback procedure at 420, the UE 115-c may fall back to a four-step random access procedure (e.g., rather than further attempting one or more subsequent two-step random access procedures) to establish the connection for communications with the base station 105-c. In some cases, the UE 115-c may be more likely to successfully perform the four-step random access procedure than a further two-step random access procedure. For example, because the random access message of the two-step random access procedure includes both the preamble and the payload, it may be substantially larger than a random access request message (e.g., Msg1) of the four-step random access procedure, and thus more likely to encounter a collision. Further, in the four-step random access procedure, the information of the data payload may be transmitted using scheduled resources rather than the contention-cased resources used in the two-step random access procedure, thus being substantially less likely to encounter a collision, for example, in a crowded environment (e.g., an environment in which many devices are communicating transmissions in the vicinity of the UE 115-c and the base station 105-c).

As similarly described with reference to FIG. 3, the UE 115-c and the base station 105-c may perform the four-step random access procedure to communicate a data payload.

The random access procedure may include the UE 115-c transmitting to the base station 105-c a preamble in a random access request message (e.g., Msg1) (not shown). In response, the base station 105-c may transmit to the UE 115-c a random access response message (e.g., Msg2) (not shown). The UE 115-c may then transmit to the base station 105-c an RRC message (e.g., Msg3) (not shown), for example, requesting a new or reconfigured connection with the base station 105-c.

In some cases, the base station 105-c may correctly receive and decode only a portion of the random access message. The base station 105-c may transmit an acknowledgement indicating the portion of the random access message that was correctly received and decoded and/or a negative acknowledgement indicating the portion of the random access message that was not correctly received and decoded. In the case that the base station 105-c successfully receives and decodes one or more preambles of one of more receives transmissions, but does not successfully receive and decode the payload information, the base station 105-c may indicate this to the UE 115-c accordingly. For example, the base station 105-c may send a fallback command, as discussed in more detail below. In some such cases, the base station 105-c may further transmit an uplink grant for a set of resources to be used to retransmit the information that was not correctly received in the payload of the initial random access message and/or the repetitions 412 of the random access message of the two-step random access procedure. That is, because the base station 105-c successfully received and decoded one or more preamble of the initial random access message and/or the repetitions 412 of the two-step random access procedure, and the base station 105-c may have already identified the UE 115-c according to one or more successfully decoded preambles, the UE 115-c may proceed directly to transmitting the RRC message (Msg3) to the base station 105-c using the corresponding allocated resources.

In some cases, four-step the random access procedure may include the base station 105-c transmitting to the UE 115-c a contention resolution message (e.g., Msg4) (not shown). After successfully performing the random access procedure, the UE 115-c and the base station 105-c may or may not establish a data connection for subsequent transmissions of data and other communications. Following the successful performance of the random access procedure, the UE 115-c and the base station 105-c may establish a communication link to communicate uplink and/or downlink transmissions, for example, based on the RRC message.

Figure 5:
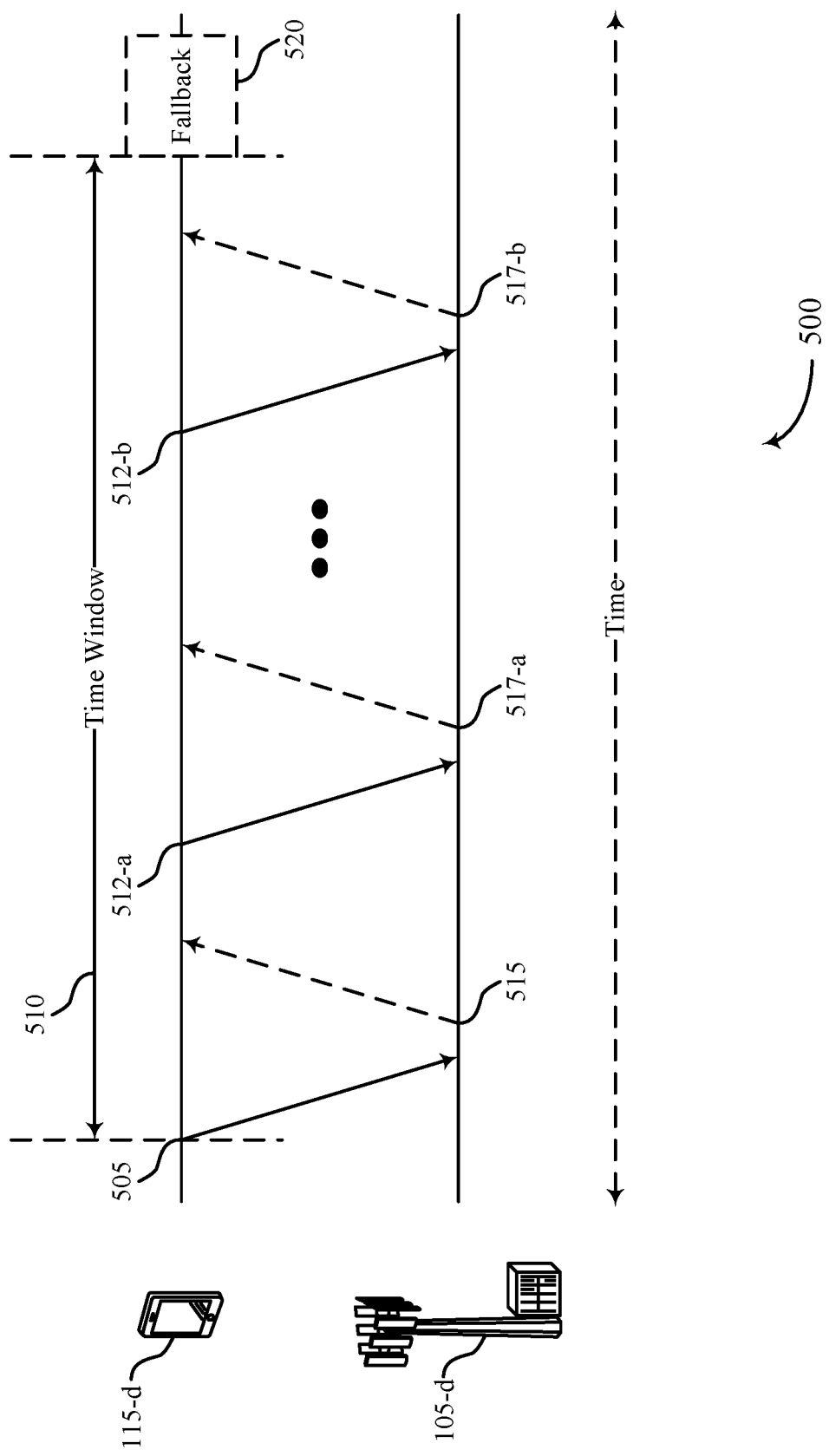
FIG. 5 illustrates an example of a transmission timeline that supports fallback procedures for two-step random access procedures in accordance with aspects of the present disclosure.

FIG. 5 illustrates an example transmission timeline 500 that supports fallback procedures for two-step random access procedures in accordance with aspects of the present disclosure. The transmission timeline 500 illustrates a transmission scheme for communications in a wireless communications system operating in the shared radio frequency spectrum, which may be implemented by aspects of the wireless communications system 100 and the wireless communications system 200 as described with reference to FIGS. 1 and 2, respectively. The transmission timeline 500 may further implement aspects of the transmission timeline 300 and the transmission timeline 400, as described with reference to FIGS. 3 and 4, respectively. The transmission timeline 500 shows example communications between a base station 105-d and a UE 115-d, which may be examples of the corresponding devices as described with reference to FIGS. 1 through 4. The transmission timeline 500 illustrates an example transmission scheme in which the UE 115-d transmits an initial random access message followed by one or more repetitions (e.g., copies, redundancy versions) of the random access message. The UE 115-d may monitor for responses after each repetition to determine whether to perform a fallback procedure to fall back from a two-step random access procedure to a four-step random access procedure.

According to the techniques described herein, the transmission timeline 500 further illustrates an example transmission scheme in which the UE 115-d may incrementally increase a transmit power and/or transmit a preamble using a new preamble sequence for a number of attempts before falling back to the four-step random access procedure. According to various aspects, the transmission timeline 500 further illustrates an example transmission scheme in which the base station 105-d may transmit an explicit signal to the UE 115-d that may configure and/or signal the UE 115-d to perform a fallback procedure. According to various aspects, the UE 115-d may determine based on channel measurements or other criteria not to perform a two-step random access procedure and immediately fall back to the four-step random access procedure.

In FIG. 5, the UE 115-d initiates a two-step random access procedure to establish a connection procedure to communicate a data payload. At 505, the UE 115-d may transmit to the base station 105-d a first message of the two-step random access procedure, for example, a random access message. As described herein, the random access message may include a preamble and a payload (whereas in, e.g., a four-step random access procedure, the UE 115-d may transmit the preamble in an initial random access request message, and transmit the payload after receiving a grant from the base station 105-d in response to completion of the random access procedure. That is, the payload may include contents or aspects equivalent to a connectivity request as well as an RRC message of a four-step random access procedure (e.g., Msg1 and Msg3 of the four-step random access procedure), and may additionally include application data (e.g., user-plane data). In some cases, the preamble and the payload may be transmitted on partially overlapping or non-overlapping sets of resources (e.g., different sets of time, frequency, and/or spatial resources). Additionally, the set of resources used to transmit the preamble may be associated with a different numerology (e.g., a different subcarrier spacing) than the set of resources used to transmit the data payload.

In some cases, the UE 115-d may start a fallback timer to monitor for a response to the transmitted random access message. The fallback timer may be configured with a time window 510, where the UE 115-d may monitor for the response to the random access message for the duration (e.g., a length given by a parameter $T_w$) of the time window 510. As shown in the transmission timeline 500, the UE 115-d may start the fallback timer substantially simultaneously with transmitting the random access message at 505, but it is also contemplated that the UE 115-d may start the fallback timer at a time before or after transmitting the random access message at 505 (as is further discussed below with respect to the fallback time and the repetitions 512 of the random access response message). Alternatively, the UE 115-d may start the fallback timer after transmitting the last of the repetitions 512.

As the transmission timeline 500 shows, the UE 115-d may transmit one or more repetitions 512 of the random access message after transmitting the initial random access message at 505. Each of the one or more repetitions 512 may include a further preamble and a further payload containing a copy of the same information or associated with the same information (e.g., a repetition, a redundancy version) that the UE 115-d included in the payload of the random access message transmitted at 505. In some cases, as similarly described herein, the preamble and the payload of each of the repetitions 512 may be transmitted on partially overlapping or non-overlapping sets of resources and may be associated with different numerologies.

In some cases, the initial random access message transmitted at 505 and each of the repetitions 512 may be transmitted using the same set of resources (e.g., each using the same set of time, frequency, and spatial resources). Alternatively, the UE 115-d may transmit one or more of the initial random access message and the repetitions 512 using different sets of resources, according to a repetition pattern configured by a repetition configuration (e.g., one or more of the transmissions using non-overlapping or partially overlapping sets of time, frequency, and spatial resources). For example, the UE 115-d may transmit each of the initial random access message at 505 and each of the repetitions 512 using different resources, thereby creating diversity between the transmissions, which may provide, for example, a relatively improved probability of avoiding a blockage of a particular transmit beam, a set of resources being used by other devices in the vicinity to communicate, and the like. Additionally, the set of resources used to transmit the random access message at 505 may be associated with a different numerology (e.g., a different subcarrier spacing) than the set of resources used to transmit the repetitions 512. Additionally, the UE 115-d may transmit one or more of the initial random access message at 505 and the repetitions 512 using varying (or, in other cases, not varying) transmit powers and/or preamble sequences, according to the repetition configuration. For example, the UE 115-d may transmit the initial random access message at 505 and the repetitions 512 using an incrementally increasing transmit power, different preamble sequences selected from a set of preamble sequences, such as the set of a number (e.g., 64) of preamble sequences associated with the cell. This may similarly provide diversity from, for example, other UEs 115 that may also be transmitting preambles to the base station 105-d, which may conflict with the transmissions of the UE 115-d (e.g., if both of the UEs 115 randomly select the same preamble sequence).

As similarly described with reference to FIG. 3, the duration of the time window 510 given by the time window parameter $T_w$, may be configured by prior signaling via the base station 105-d. Similarly, the starting point for the time window 510 may also be configured by prior signaling via the base station 105-d. For example, the base station 105-d may indicate to the UE 115-d the time window parameter $T_w$, and the starting position for the time window in SI, such as in a SIB, or other similar configuration signaling (e.g., in a master information block (MIB), remaining system information (RMSI), etc.). Further, the base station 105-d may determine and indicate to the UE 115-d the repetition pattern for each of the one or more repetitions 512. The repetition pattern may include the number of repetitions 512 (e.g., according to a parameter K defining the number of repetitions) and a resource allocation for each of the repetitions 512 (e.g., time, frequency, and/or spatial resources for each of the one or more repetitions 512). The base station 105-d may similarly signal the repetition configuration, including the repetition pattern, to the UE 115-d in SI, such as in the SIB, or other similar configuration signaling.

Additionally or alternatively, the UE 115-d may transmit one or more of the initial random access message at 505 and the repetitions 512 using HARQ. In this case, in place of, or in addition to the repetition configuration, the base station 105-*d* may signal a HARQ configuration to the UE 115-*d*, for example, similarly in SI, such as in the SIB, or other similar configuration signaling. The HARQ configuration may analogously configure the UE 115-*d* to transmit one or more HARQ retransmissions of the random access message. The HARQ configuration may indicate, for example, a redundancy version parameter (e.g., a modulation and coding scheme (MCS) parameter), a resource mapping parameter for one or more sets of resources for the UE 115-*d* to transmit corresponding ones of the HARQ retransmissions, a transmit power parameter indicating one or more transmit power levels and/or a transmit power scheme (e.g., defining a formula or pattern for increasing and/or decreasing transmit power) for the UE 115-*d* to transmit corresponding ones of the HARQ retransmissions, and/or a preamble sequence parameter indicating one or more preamble sequences and/or a preamble sequencing scheme (e.g., defining a formula or pattern for selecting preamble sequences) for the UE 115-*d* to transmit corresponding ones of the HARQ retransmissions.

In some cases, the base station 105-*d* may determine the time window parameter $T_w$, the starting position for the time window 510, and/or the repetition pattern based on a QoS associated with the communications between the UE 115-*d* and the base station 105-*d*, a traffic load of communications with the base station 105-*d* (e.g., communications with the UE 115-*d* and/or other devices in the vicinity), an RRC state of the UE 115-*d* (e.g., whether the UE 115-*d* is in an RRC connected state), and/or a size of the payload that the UE 115-*d* is to transmit in the random access message. For example, in cases in which the traffic load is relatively high or the payload is relatively large, the probability of a collision may be relatively higher. Thus, in the case shown by transmission timeline 500 in which the UE 115-*d* transmits the initial random access message at 505 and one or more repetitions 512, the base station 105-*d* may determine and configure the time window parameter $T_w$, the starting position for the time window 510, and/or the repetition pattern to increase the probability that the base station 105-*d* correctly receives the full amount of transmitted information (e.g., through a greater number K repetitions 512 transmitted over more time and using different transmission resources). Alternatively, in situations in which the probability of a collision is relatively lower and/or the QoS is relatively lower, the base station 105-*d* may determine and configure the time window parameter $T_w$, the starting position for the time window 510, and/or the repetition pattern for a relatively lower probability that the base station 105-*d* correctly receives the full amount of transmitted information (e.g., through a lesser number K repetitions 512). This may, for example, provide power savings for the UE 115-*d* in situations in which reliability may be relatively less important and/or collisions may be relatively less likely.

In some cases, the base station 105-*d* may determine whether it has successfully received and decoded the information transmitted in each of the initial random access message transmitted at 505 and in the repetitions 512. In some cases, the base station 105-*d* may determine that all or a portion of the information transmitted in any one of the initial random access message and/or the repetitions 512 was successfully received and attempt to decode the included data payload. That is, upon receiving each transmission the base station 105-*d* may determine whether it successfully received and decoded the information received in that particular transmission. As shown in FIG. 5, the base station 105-*d* may determine whether it successfully received and decoded the information received in the initial random access message transmitted at 505. If the base station 105-*d* determines that the information received in the initial random access message was successfully received and decoded, the base station 105-*d* may transmit the random access response message to the UE 115-*d* at 515.

Similarly, upon receiving any of the repetitions 512, the base station 105-*d* may determine whether it successfully received and decoded the information received in the respective repetitions 512. For example, as shown in FIG. 5, the base station 105-*d* may determine whether it successfully received and decoded the information received in a first repetition 512-*a*. If the base station 105-*d* determines that the information received in the first repetition 512-1, was successfully received and decoded, the base station 105-*d* may transmit the random access response message to the UE 115-*d* at 517-*a*. As similarly shown in FIG. 5, the UE 115-*d* may continue to transmit repetitions 512 of the random access message to the base station 105-*d* according to the repetition pattern configured by the repetition configuration. At a last repetition 512-*b*, for example, the base station 105-*d* may determine whether it successfully received and decoded the information received in the last repetition 512-*b* of the random access message. If the base station 105-*d* determines that the information received in the last repetition 512-*b* (e.g., or combined with the initial transmission 505 or other repetitions 512), was successfully received and decoded, the base station 105-*d* may transmit the random access response message to the UE 115-*d* at 517-*b*. Thus, according to the repetition configuration, the base station 105-*d* may be able to configure any number of repetitions 512 to increase or decrease the probability that the base station 105-*d* successfully receives and decodes the information.

In the random access response message, as the base station 105-*d* may transmit, for example, at 515, 517-*a*, and/or 517-*b*, control information using a PDCCH (including, e.g., a grant for a PDSCH) and information for the UE 115-*d* in the PDSCH. The random access response message may include contents or aspects equivalent to a random access response message and/or a contention resolution message of a four-step random access procedure (e.g., Msg2 and Msg4 of the four-step random access procedure). For example, the random access response message may include an acknowledgement indicating that all or a portion of the random access message was successfully received and decoded. In some cases, the random access response message may further a network identifier (e.g., a C-RNTI) for subsequent communication with the UE 115-*d*, and like information.

Alternatively, in some cases, the base station 105-*d* may determine that it failed to receive and/or decode the preamble and/or the payload of the random access message. For example, the base station 105-*d* may successfully receive one or more preamble transmissions, but may fail to receive all or a portion of the information of the associated data payload due to, for example, signaling delay associated with contention on the channel (due to, e.g., a failed LBT procedure, interference, a collision, etc.) If the base station 105-*d* does not detect the random access preamble (or, e.g., the base station 105-*d* is not able to successfully perform a corresponding LBT procedure), the base station 105-*d* may not transmit the random access response message to the UE 115-*d*.

Further, in some cases, the base station 105-*d* may transmit one or more random access response messages to the UE 115-*d* (e.g., at 515, 517-*a*, and/or 517-*b*) to indicate successful reception of the random access message, but the UE 115-*d* may not successfully receive the respective random access response message. That is, the base station 105-*d* may successfully receive and decode the one or more random access messages received from the UE 115-*d*, and the base station 105-*d* may successfully perform an LBT procedure to gain access to the medium to transmit the random access response message. The base station 105-*d* may transmit a corresponding random access response message to the UE 115-*d* at, for example, 515, 517-*a*, and/or 517-*b*. However, because the spectrum is shared and not reserved, it is possible that the random access response message collides with other transmissions between devices in the vicinity of the base station 105-*d* and the UE 115-*d* (and/or the random access response message is not successfully communicated to the UE 115-*d* due to other dynamic interference and signal conditions, as described herein).

If the UE 115-*d* does not receive the random access response message by the end of the time window 510 corresponding to the fallback timer, the UE 115-*d* may perform a fallback procedure. For example, if the base station 105-*d* does not successfully receive and/or decode the entirety of the random access response message, the base station 105-*d* may not have information that would otherwise identify or indicate the random access response message, and thus the base station 105-*d* may not transmit the random access response message to the UE 115-*d*. Alternatively, even if, for example, the base station 105-*d* successfully receives and decodes the entirety of the random access response message, and the base station 105-*d* transmits the random access response message to the UE 115-*d* at 515, 517-*a*, and/or 517-*b*, the transmitted random access response message may encounter a collision or other interference such that the UE 115-*d* does not receive the random access response message. In either case, at 520, following the expiration of the time window 510 corresponding to the fallback timer, the UE 115-*d* may accordingly identify that it has not received the random access response message and determine to perform a fallback procedure.

According to various aspects, the UE 115-*d* may incrementally increase a transmit power and/or transmit a preamble using a new preamble sequence for a number of attempts before falling back to the four-step random access procedure. In some cases, the UE 115-*d* may implement a counter that counts a number of transmissions (e.g., a count of the repetitions 512) following the initial random access message transmitted at 505. The counter may have a configured upper bound that may limit a number of repetitions 512 that the UE 115-*d* is to transmit to a threshold number of repetitions 512. The base station 105-*d* may determine and signal a configuration for the counter to the UE 115-*d*, for example, similarly in SI, such as in the SIB, or other similar configuration signaling. The configuration for the counter may configure the upper bound for the threshold number of repetitions 512 that the UE 115-*d* is to transmit. In some cases, the base station 105-*d* may determine the configuration for the counter based on, for example, a QoS associated with the communications between the UE 115-*d* and the base station 105-*d*, a traffic load of communications with the base station 105-*d*, an RRC state of the UE 115-*d*, and/or a size of the payload that the UE 115-*d* is to transmit in the random access message.

In some cases, the configuration for the counter may further configure the UE 115-*d* to increase a transmit power for each of the repetitions 512, for example, according to a power ramping equation. Additionally or alternatively, the configuration for the counter may further configure the UE 115-*d* to transmit the preambles of each of the repetitions 512 using preamble sequences, for example, selected according to a preamble sequences reselections formula. Accordingly, the UE 115-*d* may transmit the initial random access message at 505 as similarly described herein. The UE 115-*d* may then transmit the repetitions 512 according to the configuration for the counter and the value of the count for the corresponding the repetition 512.

According to the counter, the UE 115-*d* may continue to transmit repetitions 512 of the random access message until the count of the repetitions 512 reaches the upper bound for the threshold number of repetitions 512 that the UE 115-*d* is to transmit, until reaching a maximum transmit power due to the power ramp (e.g., based on a capability of the UE 115-*d*), or until receiving a random access response. If the UE 115-*d* does not receive the random access response message by the time at which the UE 115-*d* meets one or more of these criteria, the UE 115-*d* may stop transmitting the repetitions 512 and perform a fallback procedure. According to different implementations, the UE 115-*d* may use the counter in addition to, or alternatively to, the fallback timer, as described herein. That is, the UE 115-*d* may monitor for the response to the random access message (e.g., at 515, 517-*a*, and/or 517-*b*) for a duration of time and/or until the counter reaches it's the upper bound.

According to various aspects, the base station 105-*d* may transmit an explicit signal to the UE 115-*d* that may configure and/or signal the UE 115-*d* to perform a fallback procedure. That is, the base station 105-*d* may transmit a fallback command to the UE 115-*d* indicating that the UE 115-*d* is to stop performing the random access procedure that the UE 115-*d* may be using, for example, the two-step random access procedure. In some cases, the base station 105-*d* may broadcast or multicast the fallback command to all UEs 115, or to the UEs 115 that are performing a random access procedure.

The base station 105-*d* may signal the fallback command in SI, such as in the SIB, or other similar configuration signaling. Additionally or alternatively, the base station 105-*d* may transmit the fallback command (e.g., in the random access response message) via downlink control information (DCI) (e.g., mapped to a PDCCH), group-common DCI, and/or one or more MAC control elements (CEs) (e.g., mapped to a PDSCH). For example, the DCI may include a field in the DCI field for fallback command signaling. For example, the field may be a single bit indicating that all UEs 115 associated with the DCI (e.g., according to the RA-RNTI) should fallback. Alternatively, the field may be more than one (1) bit, and may include multiple fallback indicators associated with different UEs (e.g., which may be identified via resources used for the random access message, preamble sequence, or a data type associated with the data payload)). Some UEs 115, for example, may decode a PDCCH, but may not decode a PDSCH, and thus may detect the DCI. The DCI subfields may indicate to the UEs 115 whether to continue attempting to successfully perform two-step random access procedure, or whether to fallback to 4-step RACH according to a fallback command.

According to various aspects, the UE 115-*d* may determine based on channel measurements or other criteria to perform, or not to perform, a two-step random access procedure and immediately fall back to the four-step random access procedure. For example, the UE 115-*d* may determine to use the two-step random access procedure or the four-step random access procedure at a beginning of the random access procedures, for example, before 505.

In some cases, the UE 115-d may estimate a transmit power that the UE 115-d may use to transmit the random access message, for example, at 505. The UE 115-d may estimate a transmit power based on downlink measurements including, for example, a received signal receive power (RSRP), signal-to-interference-plus-noise ratio (SINR) target, payload size, and/or MCS options available to the UE 115-d. If the measured transmit power that may be required is higher than, for example, a peak power of UE 115-d (e.g., according to capabilities of the 115-d), the UE 115-d may determine to perform the four-step random access procedure. Alternatively, if the measured transmit power that may be required is higher than, for example, the peak power of UE 115-d (e.g., according to capabilities of the 115-d), the UE 115-d may determine to perform either the four-step random access procedure or the two-step random access procedure.

In some cases, there may be multiple occasions for a two-step random access procedure. If, for example, there are multiple occasions for a two-step random access procedure that each may support different payload sizes, the UE 115-d may identify a subset of occasions for two-step random access procedures (e.g., K occasions) that may be compatible with the random access message (e.g., to be transmitted at 505). In some cases, the UE 115-d may sort the K occasions into a set $\{RO_1, RO_2, \ldots, RO_K\}$, and the UE 115-d may recursively transmit the random access message (e.g., starting at the smallest occasion that supports the payload size). If the random access message is unsuccessful in $RO_2$, where m is defined as $1 \leq m < K$, the UE 115-d may perform the two-step random access procedure using a two-step random access procedure at an occasion given by $RO_{m+1}$.

In the fallback procedure at 520, the UE 115-d may fall back to a four-step random access procedure (e.g., rather than further attempting one or more subsequent two-step random access procedures) to establish the connection for communications with the base station 105-d. In some cases, the UE 115-d may be more likely to successfully perform the four-step random access procedure than a further two-step random access procedure. For example, because the random access message of the two-step random access procedure includes both the preamble and the payload, it may be substantially larger than a random access request message (e.g., Msg1) of the four-step random access procedure, and thus more likely to encounter a collision. Further, in the four-step random access procedure, the information of the data payload may be transmitted using scheduled resources rather than the contention-based resources used in the two-step random access procedure, thus being substantially less likely to encounter a collision, for example, in a crowded environment (e.g., an environment in which many devices are communicating transmissions in the vicinity of the UE 115-d and the base station 105-d).

As similarly described with reference to FIG. 3, the UE 115-d and the base station 105-d may perform the four-step random access procedure to establish a connection procedure to communicate a data payload. The random access procedure may include the UE 115-d transmitting to the base station 105-d a preamble in a random access request message (e.g., Msg1) (not shown). In response, the base station 105-d may transmit to the UE 115-d a random access response message (e.g., Msg2) (not shown). The UE 115-d may then transmit to the base station 105-d an RRC message (e.g., Msg3) (not shown), for example, requesting a new or reconfigured connection with the base station 105-d.

In some cases, the base station 105-d may correctly receive and decode only a portion of the random access message. The base station 105-d may transmit an acknowledgement indicating the portion of the random access message that was correctly received and decoded and/or a negative acknowledgement indicating the portion of the random access message that was not correctly received and decoded. In the case that the base station 105-d successfully receives and decodes one or more preambles of one of more receives transmissions, but does not successfully receive and decode the payload information, the base station 105-d may indicate this to the UE 115-d accordingly (e.g., as part of a fallback command). In some such cases, the base station 105-d may further transmit an uplink grant for a set of resources to be used to retransmit the information that was not correctly received in the payload of the initial random access message and/or the repetitions 512 of the random access message of the two-step random access procedure. That is, because the base station 105-d successfully received and decoded one or more preamble of the initial random access message and/or the repetitions 512 of the two-step random access procedure, and the base station 105-d may have already identified the UE 115-d according to one or more successfully decoded preambles, the UE 115-d may proceed directly to transmitting the RRC message (Msg3) to the base station 105-d using the corresponding allocated resources.

In some cases, the four-step random access procedure may include the base station 105-d transmitting to the UE 115-d a contention resolution message (e.g., Msg4) (not shown). After successfully performing the random access procedure, the UE 115-d and the base station 105-d may or may not establish a data connection for subsequent transmissions of data and other communications. Following the successful performance of the random access procedure, the UE 115-d and the base station 105-d may establish a communication link to communicate uplink and/or downlink transmissions, for example, based on the RRC message.

Figure 6:
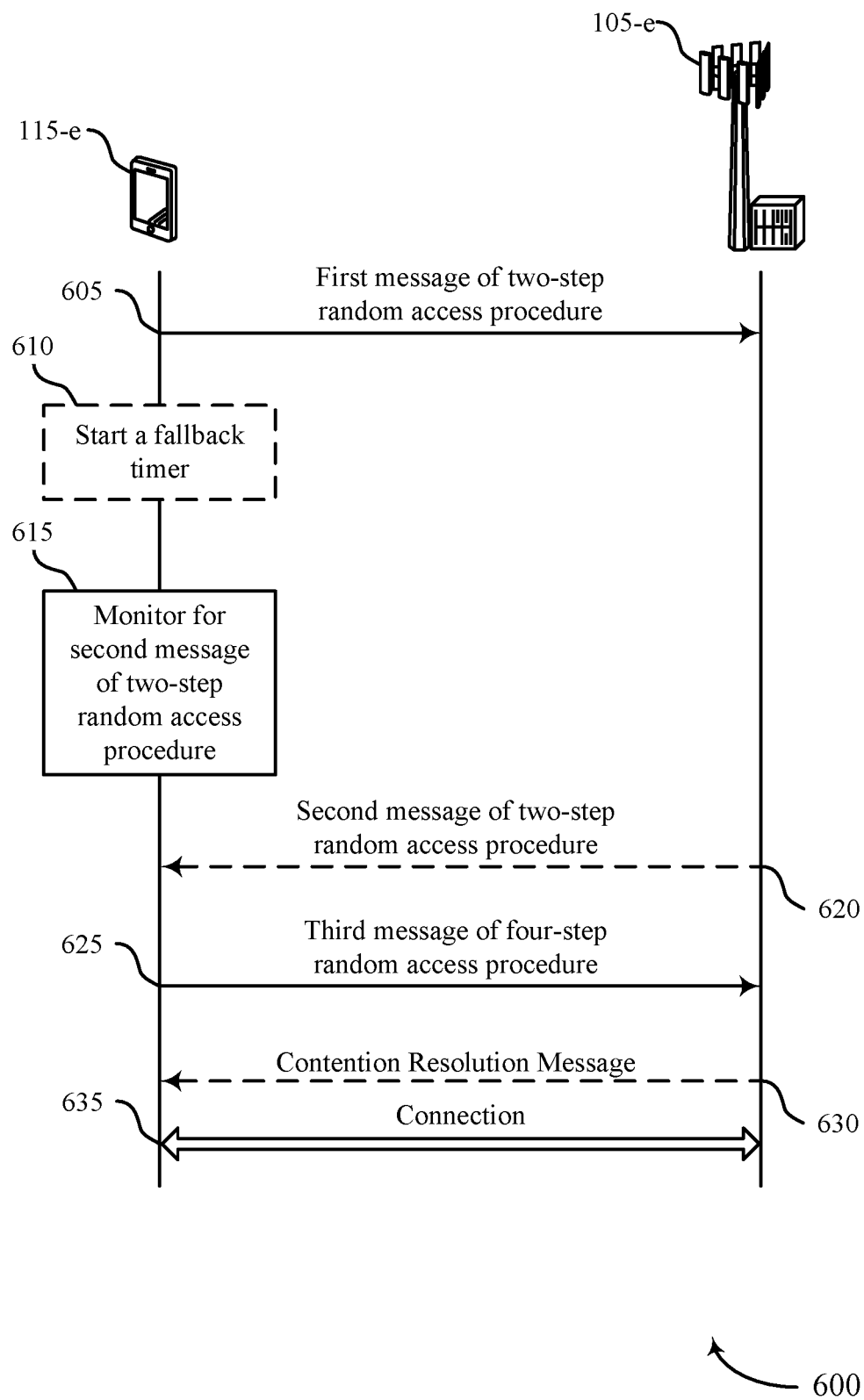
FIG. 6 illustrates an example of a process flow that supports fallback procedures for two-step random access procedures in accordance with aspects of the present disclosure.

FIG. 6 illustrates an example of a process flow 600 that supports fallback procedures for two-step random access procedures in accordance with aspects of the present disclosure. In some examples, the process flow 600 may be implemented by aspects of the wireless communications systems 100 or 200, as described with reference to FIGS. 1 and 2, respectively. The process flow 600 shows a base station 105-e and a UE 115-e, which may be examples of the corresponding devices described with reference to FIGS. 1 through 5. Alternative examples of the following may be implemented, where some steps are performed in a different order than described or are not performed at all. In some cases, steps may include additional features not mentioned below and/or further steps may be added or removed.

At 605, the UE 115-e may transmit to the base station 105-e a first message of a two-step random access procedure (e.g., a random access request message). The first message may include, for example, a preamble sequence and a data payload. In some cases, the UE may transmit the preamble sequence and the data payload using different numerologies (e.g., using different characteristics, such as subcarrier spacing, cyclic prefix size, etc.), different sets of transmission resources (e.g., time, frequency, and/or spatial resources), different portions of a carrier or carriers, different bandwidth parts, using different power control schemes (e.g., using different transmit powers), different sampling rates, and other like transmission parameters.

At 610, the UE 115-e may start a fallback timer. For example, the UE 115-e may start the fallback timer at the same time as transmitting the first message of the two-step random access procedure (e.g., at 605). Alternatively, the UE 115-*e* may start the fallback timer following an amount of time after transmitting the first message of the two-step random access procedure.

At 615, the UE 115-*e* may monitor for a second message of the two-step random access procedure (e.g., a random access response message). In some cases, the UE 115-*e* may monitor for the second message of the two-step random access procedure based on the fallback timer (e.g., monitoring for a duration of the fallback timer).

At 620, the base station 105-*e* may transmit to the UE 115-*e*, and the UE 115-*e* may receive from the base station 105-*e*, the second message of the two-step random access procedure. In some cases, the second message may include an acknowledgement of the preamble sequence (e.g., indicating that at least a portion of the preamble sequence was successfully received at the base station 105-*e*). Additionally or alternatively, the second message may include negative acknowledgement of the data payload (e.g., indicating that at least a portion of the data payload was not successfully received at the base station 105-*e*). In some cases, the second message may include an uplink grant for a set of resources (e.g., a grant of time, frequency, and/or spatial resources) to be used to retransmit information that was not correctly received (e.g., information of the data payload that was negatively acknowledged).

At 625, the UE 115-*e* may transmit to the base station 105-*e*, and the base station 105-*e* may receive from the UE 115-*e*, a third message of a four-step random access procedure. The third message may be, for example, Msg1 or Msg3 of a four-step random access procedure. In some cases, the UE 115-*e* may transmit the third message if the UE 115-*e* determines that the base station 105-*e* has not successfully received at least a portion of the first message (e.g., transmitted at 605) before an expiration of the fallback timer (e.g., following an end of the duration of the fallback timer). For example, the UE 115-*e* may transmit Msg1 of a four-step random access procedure if it does not receive a random access response (e.g., the second message of the two-step random access procedure) before expiration of the fallback timer. In some cases, in the third message, the UE 115-*e* may transmit (e.g., retransmit) information that the base station 105-*e* did not correctly receive (e.g., according to the negative acknowledgement information of the data payload). For example, the UE 115-*e* may transmit Msg3 of the four-step random access procedure if it determines that the base station 105-*e* received the preamble but not the payload of the first message of the two-step random access procedure transmitted at 605. In some cases, the UE 115-*e* may transmit the third message to the base station 105-*e* using resources correspondingly allocated in the second message (e.g., communicated at 620).

At 630, the base station 105-*e* may transmit to the UE 115-*e*, and the UE 115-*e* may receive from the base station 105-*e*, a contention resolution message, for example, in response to communicating the third message of the four-step random access procedure at 625. In some cases, the contention resolution message may be transmitted on a shared radio frequency spectrum band, such as the PDSCH. In some cases, the contention resolution message may include additional information for to be used for contention resolution between the UE 115-*e* and the base station 105-*e*. In some cases, the base station 105-*e* may scramble the contention resolution message using an identifier that may be known to the UE 115-*e* (e.g., a TC-RNTI that the base station 105-*e* may have previously signaled to the UE 115-*e*).

At 635, the UE 115-*e* and the base station 105-*e* may establish a connection for subsequent communications, for example, of additional uplink and/or downlink data and control messages. For example, the UE 115-*e* and the base station 105-*e* may establish the connection based on the random access message communicated at 625.

Figure 7:
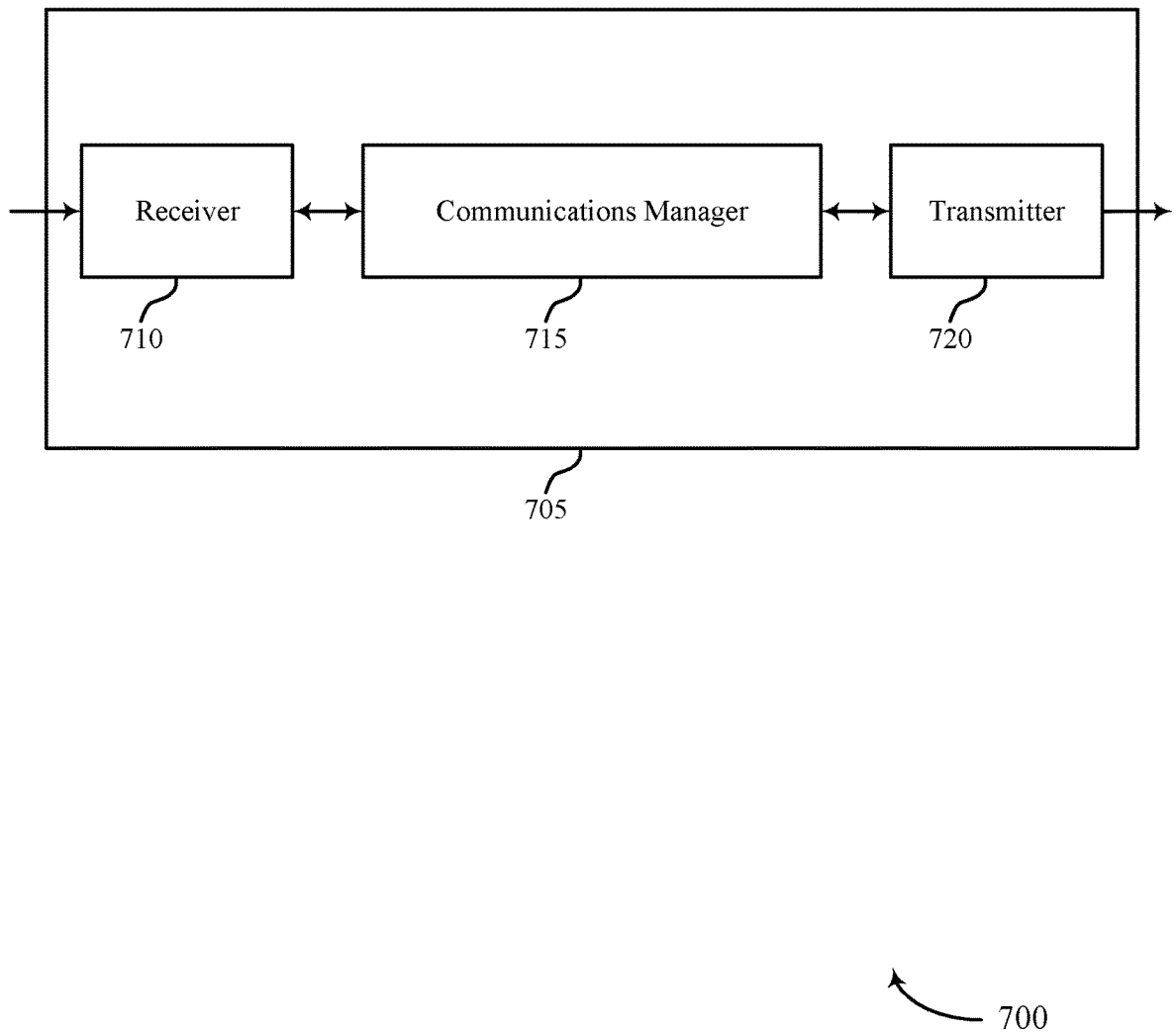
FIGS. 7 and 8 show block diagrams of devices that support fallback procedures for two-step random access procedures in accordance with aspects of the present disclosure.

FIG. 7 shows a block diagram 700 of a device 705 that supports fallback procedures for two-step random access procedures in accordance with aspects of the present disclosure, in particular as described in the previous and following examples. The device 705 may be an example of aspects of a UE as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related fallback procedures for two-step random access procedures, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit a first message of a two-step random access procedure to a base station, the first message including a preamble sequence and a data payload, monitor for a second message of the two-step random access procedure from the base station, and transmit a third message of a four-step random access procedure (e.g., a request message and/or a message including at least a portion of, or a retransmission of at least a portion of, the data payload (e.g., an RRC message)) to the base station if the UE determines based on the monitoring that the base station has not successfully received at least a portion of the first message. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
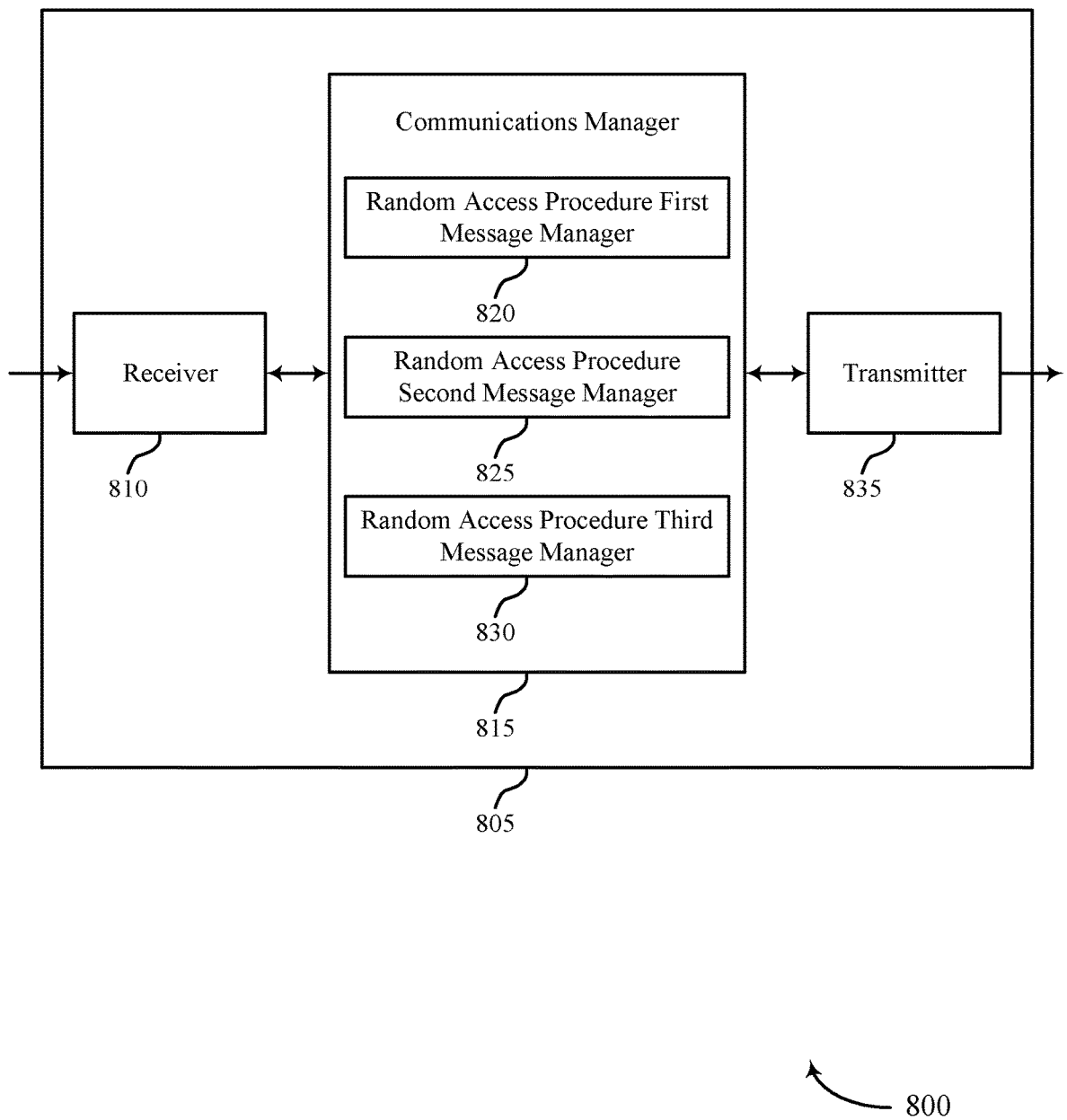

FIG. 8 shows a block diagram 800 of a device 805 that supports fallback procedures for two-step random access procedures in accordance with aspects of the present disclosure, in particular as described in the previous and following examples. The device 805 may be an example of aspects of a device 705, or a UE as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to fallback procedures for two-step random access procedures, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a random access procedure first message manager 820, a random access procedure second message manager 825, and a random access procedure third message manager 830. The communications manager 815 may be an example of aspects of the communications manager 1010 described herein.

The random access procedure first message manager 820 may transmit a first message of a two-step random access procedure to a base station, the first message including a preamble sequence and a data payload. The random access procedure second message manager 825 may monitor for a second message of the two-step random access procedure from the base station.

The random access procedure third message manager 830 may transmit a third message of a four-step random access procedure to the base station. For example, the random access procedure third message manager 830 may transmit a request message (e.g., Msg1) and/or a message including at least a portion of, or a retransmission of at least a portion of, the data payload (e.g., Msg3 or an RRC message)) if the UE determines based on the monitoring that the base station has not successfully received at least a portion of the first message.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
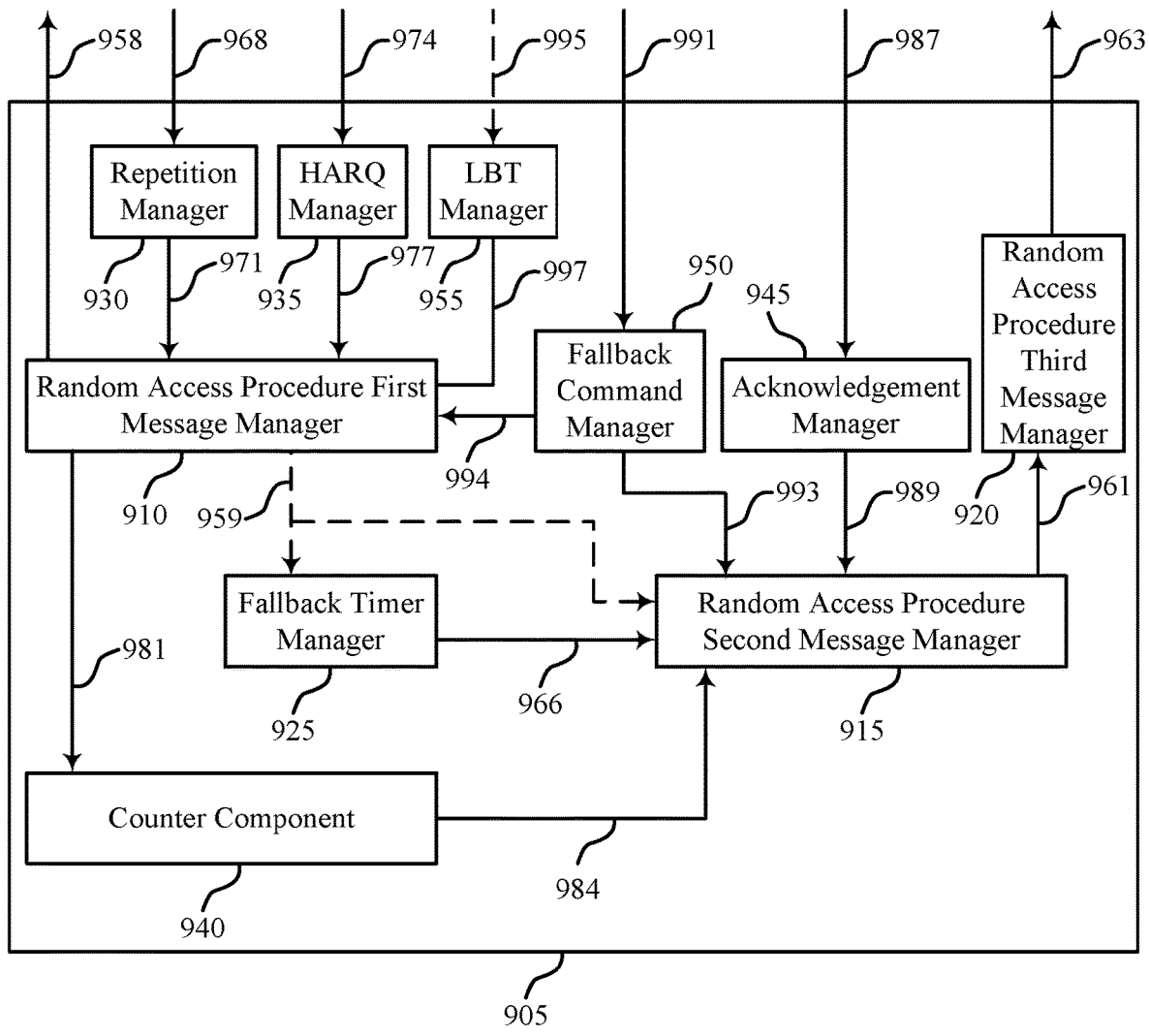
FIG. 9 shows a block diagram of a communications manager that supports fallback procedures for two-step random access procedures in accordance with aspects of the present disclosure.

FIG. 9 shows a block diagram 900 of a communications manager 905 that supports fallback procedures for two-step random access procedures in accordance with aspects of the present disclosure, in particular as described in the previous and following examples. The communications manager 905 may be an example of aspects of a communications manager 715, a communications manager 815, or a communications manager 1010 described herein. The communications manager 905 may include a random access procedure first message manager 910, a random access procedure second message manager 915, a random access procedure third message manager 920, a fallback timer manager 925, a repetition manager 930, a HARQ manager 935, a counter component 940, an acknowledgement manager 945, a fallback command manager 950, and a LBT manager 955. Each of these modules may communicate, directly or indirectly, with one another (e.g., via one or more buses).

The random access procedure first message manager 910 may transmit a first message of a two-step random access procedure to a base station, the first message including a preamble sequence and a data payload (e.g., via a transceiver, such as is described with reference to FIG. 10). For example, using a set of resources (e.g., configured time, frequency, and/or spatial resources), the random access procedure first message manager 910 may transmit one or more signals 958 including information corresponding to the first message, where the information includes the preamble sequence and the data payload.

In some examples, the first message of the two-step random access procedure may include a preamble, a PUSCH including the data payload, and a DMRS associated with the PUSCH. In some examples, the preamble may be transmitted via a first set of frequency resources and the PUSCH and DMRS may be transmitted via a second, different set of frequency resources. In some examples, the preamble may be transmitted via a first beam and the PUSCH and DMRS are transmitted via a second, different beam.

In some examples, the random access procedure first message manager 910 may identify a set of occasions associated with the two-step random access procedure. In some examples, the random access procedure first message manager 910 may select one or more occasions of the set of occasions for transmitting the first message of the two-step random access procedure based on a size of the data payload and respective sizes of each of the set of occasions.

In some examples, the random access procedure first message manager 910 may pass information 959 to the random access procedure second message manager 915 (e.g., directly or indirectly via another component, such as by passing the information 959 to the fallback timer manager 925, where information indicates that the random access procedure first message manager 910 transmitted the one or more signals 958 including the first message.

In some examples, the random access procedure first message manager 910 may determine whether to transmit the first message of the two-step random access procedure based on a signal quality measurement (e.g., RSRP, SINR, etc.), a signal quality target, an offset value associated with UE overloading, a RRC state of the UE, a size of the data payload to be transmitted in the first message, an MCS associated with the first message, an estimated transmit power for a retransmission of the first message, or any combination thereof.

The random access procedure second message manager 915 may monitor for a second message of the two-step random access procedure from the base station. In some examples, the random access procedure second message manager 915 may begin monitoring for the second message based on receiving the information 959 from the random access procedure second message manager 915. In some examples, the random access procedure second message manager 915 may pass information 961 to the random access procedure third message manager 920 indicating whether the random access procedure second message manager 915 received the second message (e.g., the information 961 may indicate that the random access procedure second message manager 915 monitored for, but did not detect, the second message).

In some examples, the random access procedure second message manager 915 may monitor for the second message of the two-step random access procedure based on a fallback timer, for example, at the fallback timer manager 925, as further described herein. In some examples, the monitoring may include monitoring for the second message of the two-step random access procedure for a duration of the fallback timer.

The random access procedure third message manager 920 may transmit a third message of a four-step random access procedure to the base station (e.g., via a transceiver, such as is described with reference to FIG. 10), for example, if the UE determines based on the monitoring that the base station has not successfully received at least a portion of the first message (e.g., according to information 961 received from the random access procedure second message manager 915 indicating that the random access procedure second message manager 915 monitored for, but did not detect, the second message). For example, the random access procedure third message manager 920 may transmit one or more signals 963 including information corresponding to the third message using a set of resources (e.g., configured time, frequency, and/or spatial resources).

In some examples, the random access procedure third message manager 920 may determine whether to transmit the third message of the four-step random access procedure (e.g., a random access message) based on a signal quality measurement (e.g., RSRP, SINR, etc.), a signal quality target, an offset value associated with UE overloading, a RRC state of the UE, a size of the data payload to be transmitted in the third message, an MCS associated with the third message, an estimated transmit power for the third message, or any combination thereof.

The fallback timer manager 925 may start a fallback timer upon transmitting the first message of the two-step random access procedure (e.g., based on receiving the information 959 from the random access procedure first message manager 910 indicating that the random access procedure first message manager 910 transmitted the one or more signals 958 including the first message). In some examples, the fallback timer manager 925 may start the fallback timer for the UE to monitor for the second message of the two-step random access procedure.

In some examples, the fallback timer manager 925 may receive signaling indicating at least a duration of the fallback timer, where the signaling is system information, one or more RRC messages, or both (e.g., in the information 959 received from the random access procedure first message manager 910). In some examples, the duration of the fallback timer may be based on an associated quality of service, a traffic load, an RRC state, a size of the data payload of the first message, or a combination thereof.

In some examples, the fallback timer manager 925 may pass information 966 to the random access procedure third message manager 920 indicating a status of the fallback timer. For example, the fallback timer manager 925 may indicate in the information 966 an expiration of the fallback timer (e.g., at an end of the duration of the fallback timer).

In some examples, the random access procedure third message manager 920 may transmit the third message if the random access procedure second message manager 915 determines that the base station has not successfully received the at least the portion of the first message before an expiration of the fallback timer (e.g., before receiving information 966 from the fallback timer manager 925 indicating the expiration of the fallback timer). For example, if the random access procedure second message manager 915 determines that the base station has not successfully received the at least the portion of the first message before the expiration of the fallback timer, the random access procedure second message manager 915 may indicate as such to the random access procedure third message manager 920 in the information 961, and the random access procedure third message manager 920 may correspondingly transmit the signals 963 including information corresponding to the third message.

The repetition manager 930 may receive a signal 968 (e.g., from the base station) including information indicating a repetition configuration for the repetitions of the first message of the two-step random access procedure, the repetition configuration indicating a repetition periodicity for periodic repetitions, a repetition pattern for aperiodic repetitions, a resource assignment for one or more of the repetitions, or a combination thereof. The repetition manager 930 may pass information 971 to the random access procedure first message manager 910 indicating the repetition configuration for the repetitions of the first message, for example, according to the information received in the signal 968.

According to the repetition configuration, the random access procedure first message manager 910 may transmit one or more repetitions of the first message of the two-step random access procedure (e.g., using repetitions configured according to the repetition configuration indicated in the information 971 corresponding to the information received in the signal 968). In some examples, transmitting the one or more repetitions of the first message of the two-step random access procedure may include transmitting incremental redundancy information (e.g., additional coded information) associated with the data payload. In some examples, at least one of the repetitions of the first message of the two-step random access procedure may be transmitted with a different transmit power, preamble sequence, resource mapping, or a combination thereof, from at least one other of the repetitions of the first message of the two-step random access procedure.

In some examples, the random access procedure first message manager 910 may pass information 959 to the random access procedure second message manager 915 indicating the transmission of the one or more repetitions of the first message of the two-step random access procedure, for example, directly or indirectly via another component (e.g., via the fallback timer manager 925). According to the repetition configuration (e.g., according to the information 959 received from the random access procedure first message manager 910 and/or the information 966 received from the fallback timer manager 925), the random access procedure second message manager 915 may monitor for the second message of the two-step random access procedure, for example, after the random access procedure first message manager 910 transmits each of the repetitions of the first message of the two-step random access procedure.

In some examples, the random access procedure first message manager 910 may pass information 959 to the fallback timer manager 925 indicating the transmission of the one or more repetitions of the first message of the two-step random access procedure. In some examples, the fallback timer manager 925 may start the fallback timer upon a transmission of a last repetition of the one or more repetitions of the first message (e.g., according to the repetition configuration indicated by the information 959 received from the random access procedure first message manager 910). Additionally or alternatively, in some examples, the fallback timer manager 925 may start the fallback timer upon transmitting a first repetition of the one or more repetitions of the first message (e.g., according to the repetition configuration indicated by the information 959 received from the random access procedure first message manager 910).

In some examples, the random access procedure first message manager 910 may pass information 959 to the random access procedure second message manager 915, where the information 959 indicates the transmission of the one or more repetitions of the first message of the two-step random access procedure (e.g., transmitted in the one more signals 958). In some examples, the random access procedure third message manager 920 may transmit the third message of the four-step random access procedure if the random access procedure second message manager 915 determines that the base station has not successfully received the at least the portion of the one or more of the repetitions of the first message. In some examples, the random access procedure third message manager 920 may transmit the third message of the four-step random access procedure if the random access procedure second message manager 915 determines that the base station has not successfully received the at least the portion of the one or more repetitions of the first message before an expiration of the fallback timer (e.g., before receiving information 966 from the fallback timer manager 925 indicating the expiration of the fallback timer). For example, if the random access procedure second message manager 915 determines that the base station has not successfully received the at least the portion of the one or more repetitions of the first message before the expiration of the fallback timer, the random access procedure second message manager 915 may indicate as such to the random access procedure third message manager 920 in the information 961, and the random access procedure third message manager 920 may correspondingly transmit the signals 963 including information corresponding to the third message of the four-step random access procedure.

In some examples, the random access procedure first message manager 910 may retransmit the first message of the two-step random access procedure using a maximum transmit power, using a maximum number of different preamble sequences, or a combination thereof. In some examples, the random access procedure third message manager 920 may transmit the third message of the four-step random access procedure if the UE determines that it did not successfully receive the second message of the two-step random access procedure after retransmitting the first message of the two-step random access procedure using a maximum transmit power, using a maximum number of different preamble sequences, or a combination thereof.

In some examples, the HARQ manager 935 may receive a signal 974 (e.g., from the base station) including information indicating a HARQ configuration for the repetitions of the first message of the two-step random access procedure, the HARQ configuration indicating an MCS for the repetitions, preamble sequences for one or more of the repetitions, a transmit power for one or more of the repetitions, a resource assignment for one or more of the repetitions, or a combination thereof. The HARQ manager 935 may pass information 977 to the random access procedure first message manager 910 indicating the HARQ configuration for the repetitions of the first message, for example, according to the information received in the signal 974, and the random access procedure first message manager 910 may accordingly transmit the repetitions of the first message of the two-step random access procedure (e.g., using repetitions configured according to the HARQ configuration indicated in the information 977 corresponding to the information received in the signal 974).

In some examples the random access procedure first message manager 910 may pass information 981 to the counter component 940 indicating transmission of one or more of (e.g., each of) the transmissions of the one or more repetitions of the first message of the two-step random access procedure. The counter component 940 may update a counter upon the transmission of each of the one or more repetitions of the first message of the two-step random access procedure, for example, according to the information 981 received from the random access procedure first message manager 910.

In some examples, the counter component 940 may be configured with a threshold, and the counter component 940 may update (e.g., increment) the counter until a value of the counter satisfies the threshold. The counter component 940 may pass information 984 to the random access procedure second message manager 915 indicating a status of the counter (e.g., indicating that the value of the counter satisfies the threshold).

In some examples, the random access procedure third message manager 920 may transmit the third message of the four-step random access procedure if the random access procedure second message manager 915 determines that the base station has not successfully received the at least the portion of the one or more of the repetitions of the first message (e.g., based on the random access procedure second message manager 915 determining that the base station has not successfully received the at least the portion of the one or more of the repetitions before receiving the information 984 that the counter satisfies the threshold and signaling as such the random access procedure third message manager 920 via the information 961).

In some examples, the acknowledgement manager 945 may receive a signal 974 (e.g., from the base station) including information including the second message of the two-step random access procedure, where the second message includes an acknowledgement of the preamble sequence. The acknowledgement manager 945 may pass information to the random access procedure second message manager 915 that indicates the acknowledgement of the preamble sequence received in the signal 987, and the random access procedure second message manager 915 may correspondingly indicate the acknowledgement to the random access procedure third message manager 920 in the information 961. In some examples, the random access procedure third message manager 920 may transmit a PUSCH transmission including the data payload in response to receiving the second message of the two-step random access procedure from the base station (e.g., according to the information 961 corresponding to the information 989 from the acknowledgement manager for the acknowledgement).

In some examples, the acknowledgement manager 945 may receive a signal 974 (e.g., from the base station) including information including the second message of the two-step random access procedure, where the second message includes a negative acknowledgement of the data payload. The acknowledgement manager 945 may pass information to the random access procedure second message manager 915 that indicates the negative acknowledgement of the data payload received in the signal 987, and the random access procedure second message manager 915 may correspondingly indicate the negative acknowledgement to the random access procedure third message manager 920 in the information 961. In some examples, the random access procedure third message manager 920 may transmit a PUSCH transmission including a retransmission of at least a portion of the data payload in response to receiving the second message of the two-step random access procedure from the base station (e.g., according to the information 961 corresponding to the information 989 from the acknowledgement manager for the negative acknowledgement).

In some examples, the fallback command manager 950 may receive a signal 991 (e.g., from the base station) including information indicating a fallback command, the fallback command indicating that the UE is to terminate or suspend the two-step random access procedure.

In some examples, the fallback command manager 950 may identify, from a set of fallback indicators in the fallback command, a fallback indicator of whether the UE is to terminate or suspend the two-step random access procedure based on a type of the data payload. In some examples, the fallback command is received via one or more of DCI, group-common DCI, one or more MAC CEs, or a combination thereof. The fallback command manager 950 may pass information 993 to the random access procedure second message manager 915 indicating the fallback command that the UE is to terminate or suspend the two-step random access procedure, and the random access procedure second message manager 915 may accordingly pass information 961 to the random access procedure third message manager 920 indicating that the random access procedure third message manager 920 is to transmit the third message of the four-step random access procedure based on the fallback command or to transmit a number of repetitions (e.g., retransmissions) thereof (e.g., via the signals 963).

In some examples, the fallback command manager 950 may pass information 994 to the random access procedure first message manager 910 indicating the fallback command and, in some examples, indicating a number of retransmissions of the first message of the two-step random access procedure prior to terminating or suspending the two-step random access procedure. In some examples, the information 994 indicating the fallback command may additionally indicate a set of non-contention resources and a transmission scheme for the transmitting the random access message of the four-step random access procedure. According to the information 994, the random access procedure first message manager 910 may transmit one or more retransmissions of the first message of the two-step random access procedure (e.g., via one or more signals 958) before terminating or suspending the two-step random access procedure.

In some examples, the LBT manager 955 may receive a signal 995 (e.g., from the base station) including information indicating a HARQ configuration for the repetitions of the first message of the two-step random access procedure, the HARQ configuration indicating an MCS for the repetitions, preamble sequences for one or more of the repetitions, a transmit power for one or more of the repetitions, a resource assignment for one or more of the repetitions, or a combination thereof. The HARQ manager 935 may pass information 977 to the random access procedure first message manager 910 indicating the HARQ configuration for the repetitions of the first message, for example, according to the information received in the signal 974, and the random access procedure first message manager 910 may accordingly transmit the repetitions of the first message of the two-step random access procedure (e.g., using repetitions configured according to the HARQ configuration indicated in the information 977 corresponding to the information received in the signal 974).

The LBT manager 955 may perform a first LBT procedure prior to the transmission of the preamble of the two-step random access procedure (e.g., from the random access procedure first message manager 910). For example, the LBT manager 955 may sense an energy level of a channel associated with the channel or channels on which the random access procedure first message manager 910 is to transmit the first message of the two-step random access procedure. In some examples, the LBT manager 955 may perform a second LBT procedure prior to transmitting the PUSCH and DMRS of the two-step random access procedure.

In some examples, the LBT manager 955 may pass information 997 to the random access procedure first message manager 910 indicating that the first and/or second respective LBT procedure was successful (e.g., indicating that the LBT manager 955 did not sense potentially interfering transmissions in the respective LBT procedure or procedures). According to the information 997 indicating, for example, that the channel or channels are available, the random access procedure first message manager 910 may then transmit one or more signals 958 including the first message or perform the other operations described herein.

Figure 10:
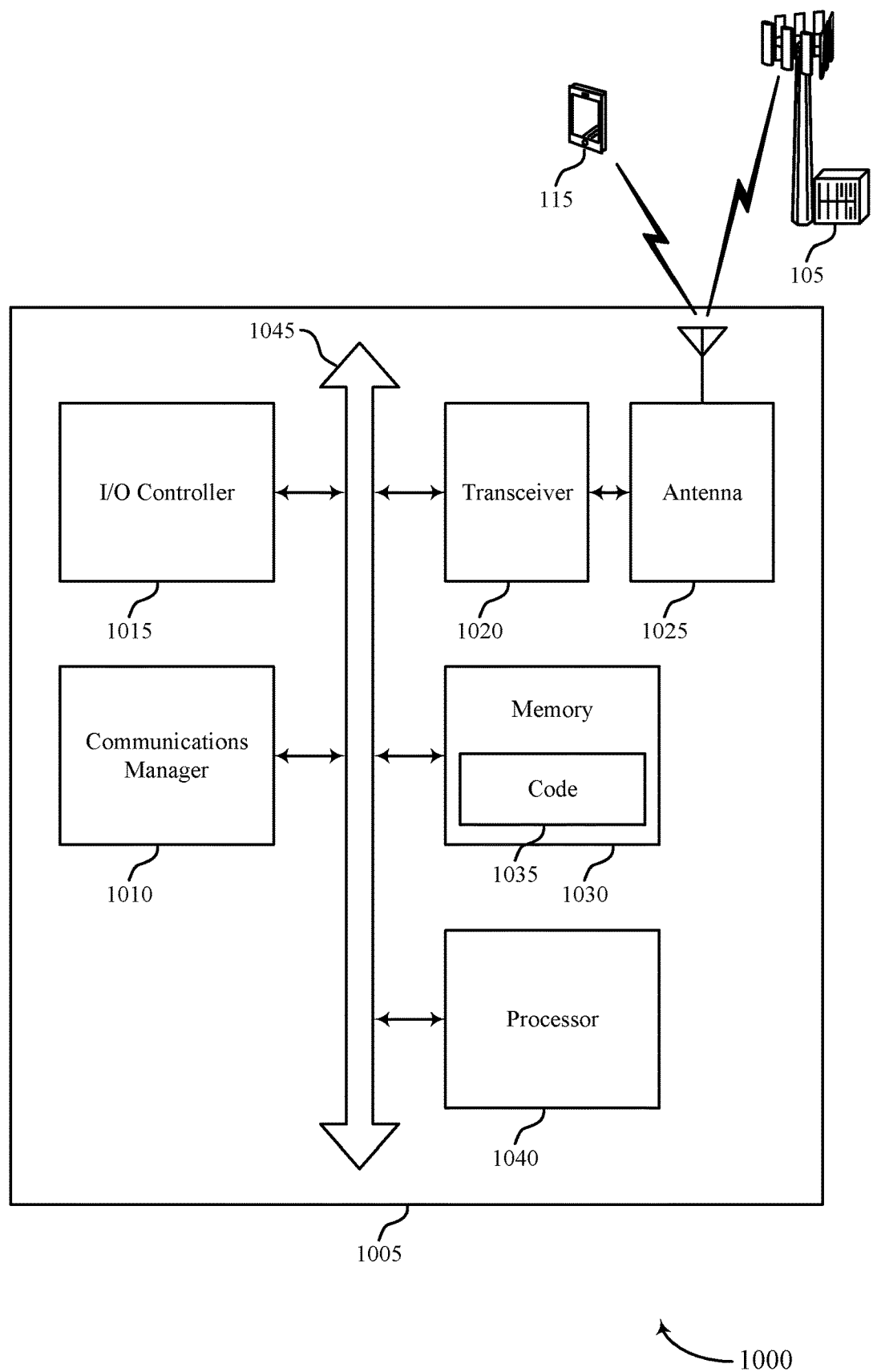
FIG. 10 shows a diagram of a system including a device that supports fallback procedures for two-step random access procedures in accordance with aspects of the present disclosure.

FIG. 10 shows a diagram of a system 1000 including a device 1005 that supports fallback procedures for two-step random access procedures in accordance with aspects of the present disclosure, in particular as described in the previous and following examples. The device 1005 may be an example of or include the components of device 705, device 805, or a UE as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit a first message of a two-step random access procedure to a base station, the first message including a preamble sequence and a data payload, monitor for a second message of the two-step random access procedure from the base station, and transmit a third message of a four-step random access procedure to the base station if the UE determines based on the monitoring that the base station has not successfully received at least a portion of the first message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting fallback procedures for two-step random access procedures, in particular as described in the previous and following examples).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
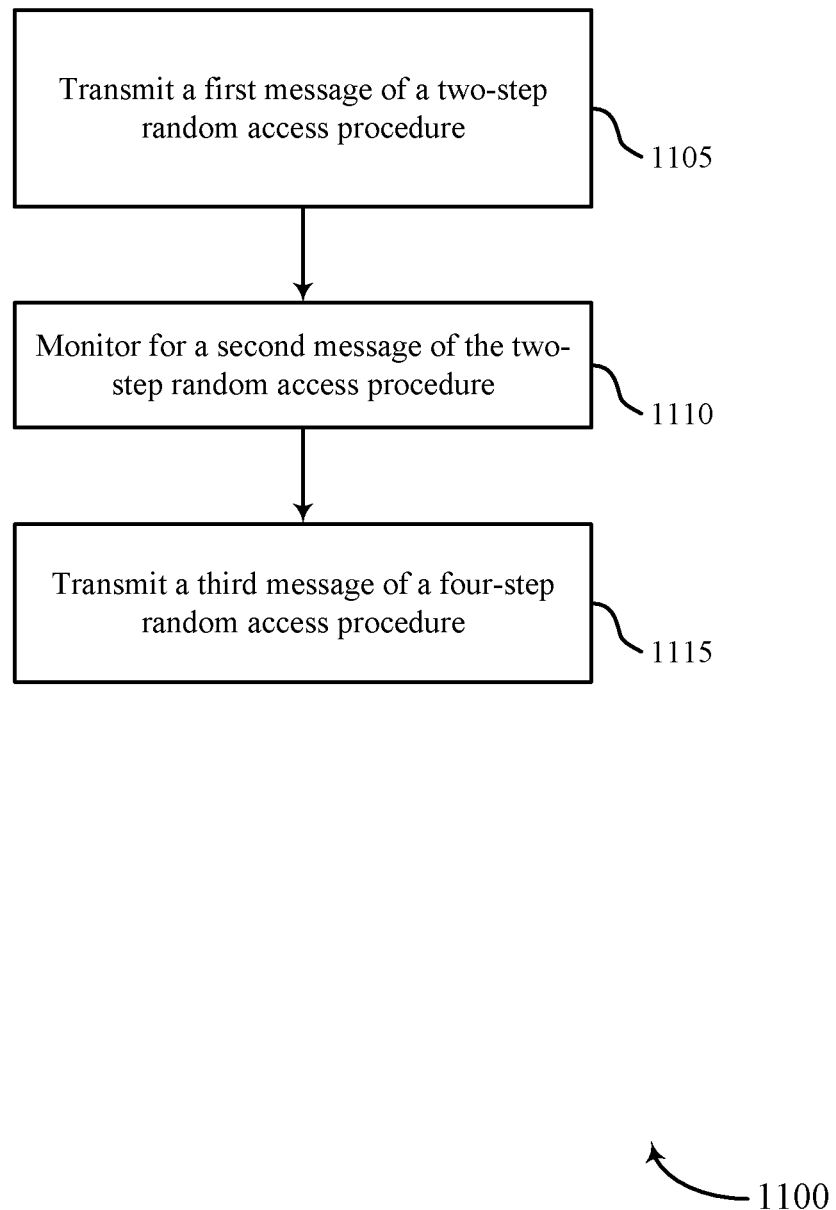
FIGS. 11 through 15 show flowcharts illustrating methods that support fallback procedures for two-step random access procedures in accordance with aspects of the present disclosure.

FIG. 11 shows a flowchart illustrating a method 1100 that supports fallback procedures for two-step random access procedures in accordance with aspects of the present disclosure. The operations of method 1100 may be implemented by a UE or its components as described herein. For example, the operations of method 1100 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the UE may transmit a first message of a two-step random access procedure to a base station, the first message including a preamble sequence and a data payload. For example, the UE may identify time-frequency resources over which the first message may be transmitted, and the UE may encode and modulate the bits that indicate the first message to transmit the encoded and modulated bits over the identified time-frequency resources. The operations of 1105 may be performed according to the methods described herein. In some examples, aspects of the operations of 1105 may be performed by a random access procedure first message manager as described with reference to FIGS. 7 through 10.

At 1110, the UE may monitor for a second message of the two-step random access procedure from the base station. For example, the UE may identify time-frequency resources over which the second message may be communicated (e.g., from the base station to the UE), and the UE may monitor the identified resource for a transmission for the UE (or an indication of a transmission). The operations of 1110 may be performed according to the methods described herein. In some examples, aspects of the operations of 1110 may be performed by a random access procedure second message manager as described with reference to FIGS. 7 through 10.

At 1115, the UE may transmit a third message of a four-step random access procedure to the base station if the UE determines based on the monitoring that the base station has not successfully received at least a portion of the first message. For example, the UE may identify time-frequency resources over which the random access message may be transmitted, and the UE may encode and modulate the bits that indicate the third message to transmit the encoded and modulated bits over the identified time-frequency resources. The operations of 1115 may be performed according to the methods described herein. In some examples, aspects of the operations of 1115 may be performed by a random access procedure third message manager as described with reference to FIGS. 7 through 10.

Figure 12:
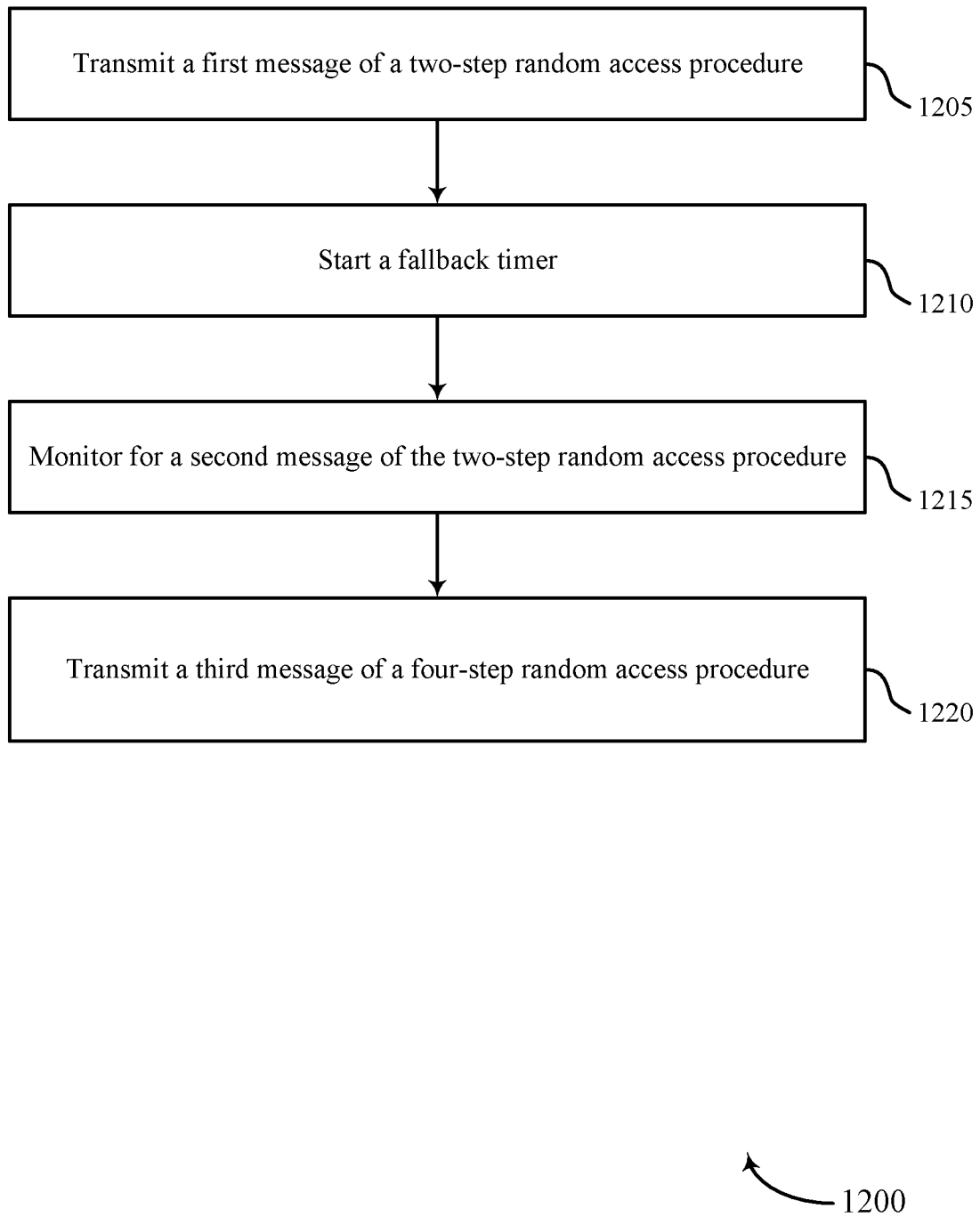

FIG. 12 shows a flowchart illustrating a method 1200 that supports fallback procedures for two-step random access procedures in accordance with aspects of the present disclosure. The operations of method 1200 may be implemented by a UE or its components as described herein. For example, the operations of method 1200 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1205, the UE may transmit a first message of a two-step random access procedure to a base station, the first message including a preamble sequence and a data payload. For example, the UE may identify time-frequency resources over which the first message may be transmitted, and the UE may encode and modulate the bits that indicate the first message to transmit the encoded and modulated bits over the identified time-frequency resources. The operations of 1205 may be performed according to the methods described herein. In some examples, aspects of the operations of 1205 may be performed by a random access procedure first message manager as described with reference to FIGS. 7 through 10.

At 1210, the UE may start a fallback timer. For example, a processor of the UE may implement a command to begin a fallback timer (e.g., having a configured duration) upon transmitting the first message of the two-step random access procedure. The operations of 1210 may be performed according to the methods described herein. In some examples, aspects of the operations of 1210 may be performed by a fallback timer manager as described with reference to FIGS. 7 through 10.

At 1215, the UE may monitor for a second message of the two-step random access procedure from the base station. For example, the UE may identify time-frequency resources over which the second message may be communicated (e.g., from the base station to the UE), and the UE may monitor the identified resource for a transmission for the UE (or an indication of a transmission). In some cases, monitoring may include monitoring for the second message of the two-step random access procedure based on the fallback timer. The operations of 1215 may be performed according to the methods described herein. In some examples, aspects of the operations of 1215 may be performed by a random access procedure second message manager as described with reference to FIGS. 7 through 10.

At 1220, the UE may transmit a third message of a four-step random access procedure to the base station if the UE determines based on the monitoring that the base station has not successfully received at least a portion of the first message. The third message may be, for example, Msg1, or a message including at least a portion of, or a retransmission of at least a portion of, the data payload (e.g., Msg3 or an RRC message). For example, the UE may identify time-frequency resources over which the third message may be transmitted, and the UE may encode and modulate the bits that indicate the random access message to transmit the encoded and modulated bits over the identified time-frequency resources. In some cases, transmitting the third message of the four-step random access procedure may include transmitting the third message if the UE determines that the base station has not successfully received the at least the portion of the first message before an expiration of the fallback timer. The operations of 1220 may be performed according to the methods described herein. In some examples, aspects of the operations of 1220 may be performed by a random access procedure third message manager as described with reference to FIGS. 7 through 10.

Figure 13:
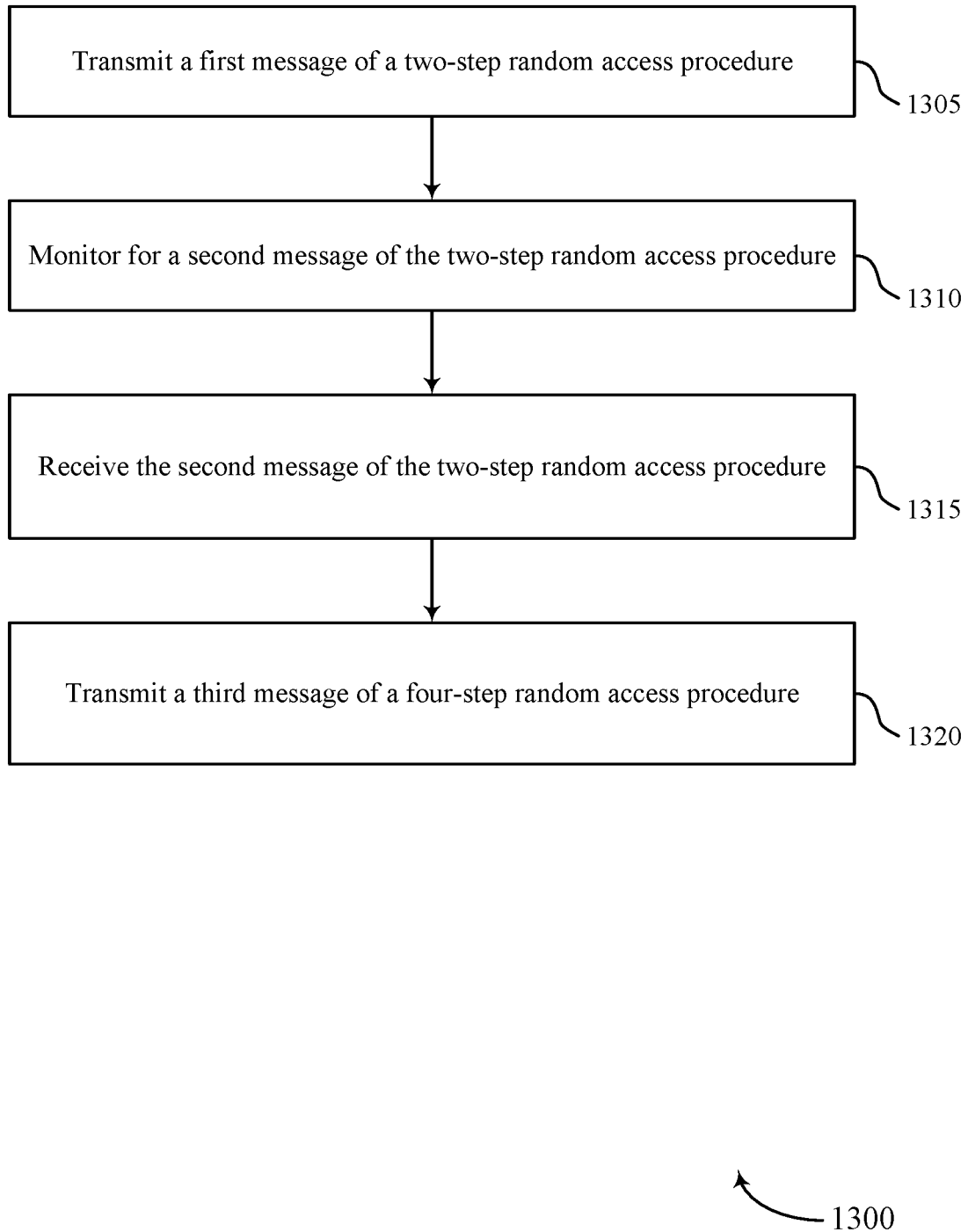

FIG. 13 shows a flowchart illustrating a method 1300 that supports fallback procedures for two-step random access procedures in accordance with aspects of the present disclosure. The operations of method 1300 may be implemented by a UE or its components as described herein. For example, the operations of method 1300 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1305, the UE may transmit a first message of a two-step random access procedure to a base station, the first message including a preamble sequence and a data payload. For example, the UE may identify time-frequency resources over which the first message may be transmitted, and the UE may encode and modulate the bits that indicate the first message to transmit the encoded and modulated bits over the identified time-frequency resources. The operations of 1305 may be performed according to the methods described herein. In some examples, aspects of the operations of 1305 may be performed by a random access procedure first message manager as described with reference to FIGS. 7 through 10.

At 1310, the UE may monitor for a second message of the two-step random access procedure from the base station. For example, the UE may identify time-frequency resources over which the second message may be communicated (e.g., from the base station to the UE), and the UE may monitor the identified resource for a transmission for the UE (or an indication of a transmission). The operations of 1310 may be performed according to the methods described herein. In some examples, aspects of the operations of 1310 may be performed by a random access procedure second message manager as described with reference to FIGS. 7 through 10.

At 1315, the UE may receive, based on the monitoring, the second message of the two-step random access procedure from the base station, the second message including at least one of a negative acknowledgement of the data payload, a fallback command, an uplink grant for the third message of the four-step random access procedure, or a combination thereof. The operations of 1315 may be performed according to the methods described herein. In some examples, aspects of the operations of 1315 may be performed by an acknowledgement manager as described with reference to FIGS. 7 through 10.

At 1320, the UE may transmit a third message of a four-step random access procedure to the base station if the UE determines based on the monitoring that the base station has not successfully received at least a portion of the first message. The third message may be, for example, Msg1, or a message including at least a portion of, or a retransmission of at least a portion of, the data payload (e.g., Msg3 or an RRC message). For example, the UE may identify time-frequency resources over which the third message may be transmitted, and the UE may encode and modulate the bits that indicate the third message to transmit the encoded and modulated bits over the identified time-frequency resources. In some cases, transmitting the third message of the four-step random access procedure includes transmitting a PUSCH transmission including a retransmission of at least a portion of the data payload in response to receiving the second message of the two-step random access procedure from the base station. The operations of 1320 may be performed according to the methods described herein. In some examples, aspects of the operations of 1320 may be performed by a random access procedure third message manager as described with reference to FIGS. 7 through 10.

Figure 14:
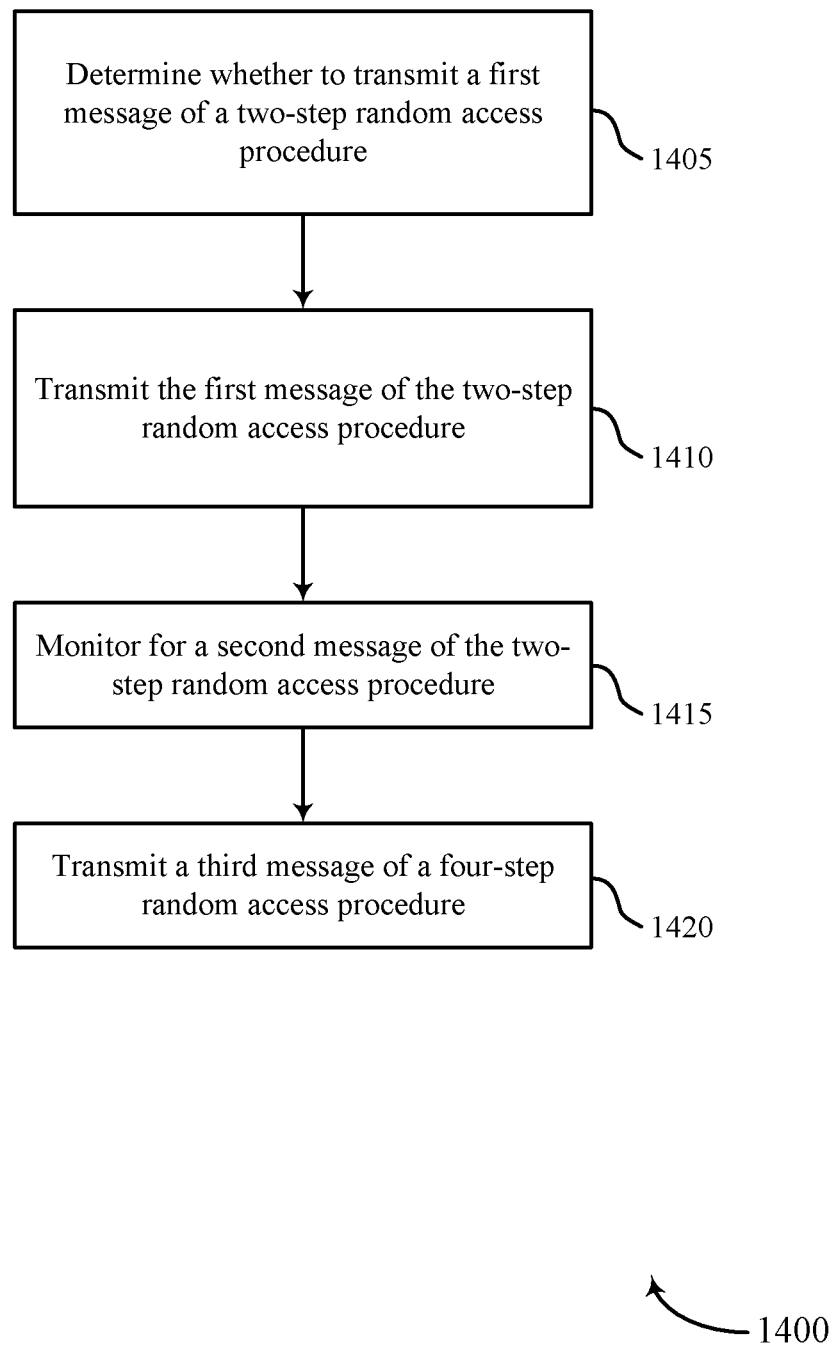

FIG. 14 shows a flowchart illustrating a method 1400 that supports fallback procedures for two-step random access procedures in accordance with aspects of the present disclosure. The operations of method 1400 may be implemented by a UE or its components as described herein. For example, the operations of method 1400 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1405, the UE may determine whether to transmit a first message of a two-step random access procedure. For example, the UE may determine whether to transmit the first message based on one or more of: a signal quality measurement (e.g., RSRP, SINR, etc.), a signal quality target, an offset value associated with UE overloading, a RRC state of the UE, a size of the data payload to be transmitted in the first message, an MCS associated with the first message, an estimated transmit power for a retransmission of the first message, or any combination thereof. The operations of 1405 may be performed according to the methods described herein. In some examples, aspects of the operations of 1405 may be performed by a random access procedure third message manager as described with reference to FIGS. 7 through 10.

At 1410, the UE may transmit the first message of the two-step random access procedure to a base station, the first message including a preamble sequence and a data payload. For example, the UE may identify time-frequency resources over which the first message may be transmitted, and the UE may encode and modulate the bits that indicate the first message to transmit the encoded and modulated bits over the identified time-frequency resources. The operations of 1410 may be performed according to the methods described herein. In some examples, aspects of the operations of 1410 may be performed by a random access procedure first message manager as described with reference to FIGS. 7 through 10.

At 1415, the UE may monitor for a second message of the two-step random access procedure from the base station. For example, the UE may identify time-frequency resources over which the second message may be communicated (e.g., from the base station to the UE), and the UE may monitor the identified resource for a transmission for the UE (or an indication of a transmission). The operations of 1415 may be performed according to the methods described herein. In some examples, aspects of the operations of 1415 may be performed by a random access procedure second message manager as described with reference to FIGS. 7 through 10.

At 1420, the UE may transmit a third message of a four-step random access procedure to the base station if the UE determines based on the monitoring that the base station has not successfully received at least a portion of the first message. The third message may be, for example, Msg1, or a message including at least a portion of, or a retransmission of at least a portion of, the data payload (e.g., Msg3 or an RRC message). For example, the UE may identify time-frequency resources over which the third message may be transmitted, and the UE may encode and modulate the bits that indicate the third message to transmit the encoded and modulated bits over the identified time-frequency resources. The operations of 1420 may be performed according to the methods described herein. In some examples, aspects of the operations of 1420 may be performed by a random access procedure third message manager as described with reference to FIGS. 7 through 10.

Figure 15:
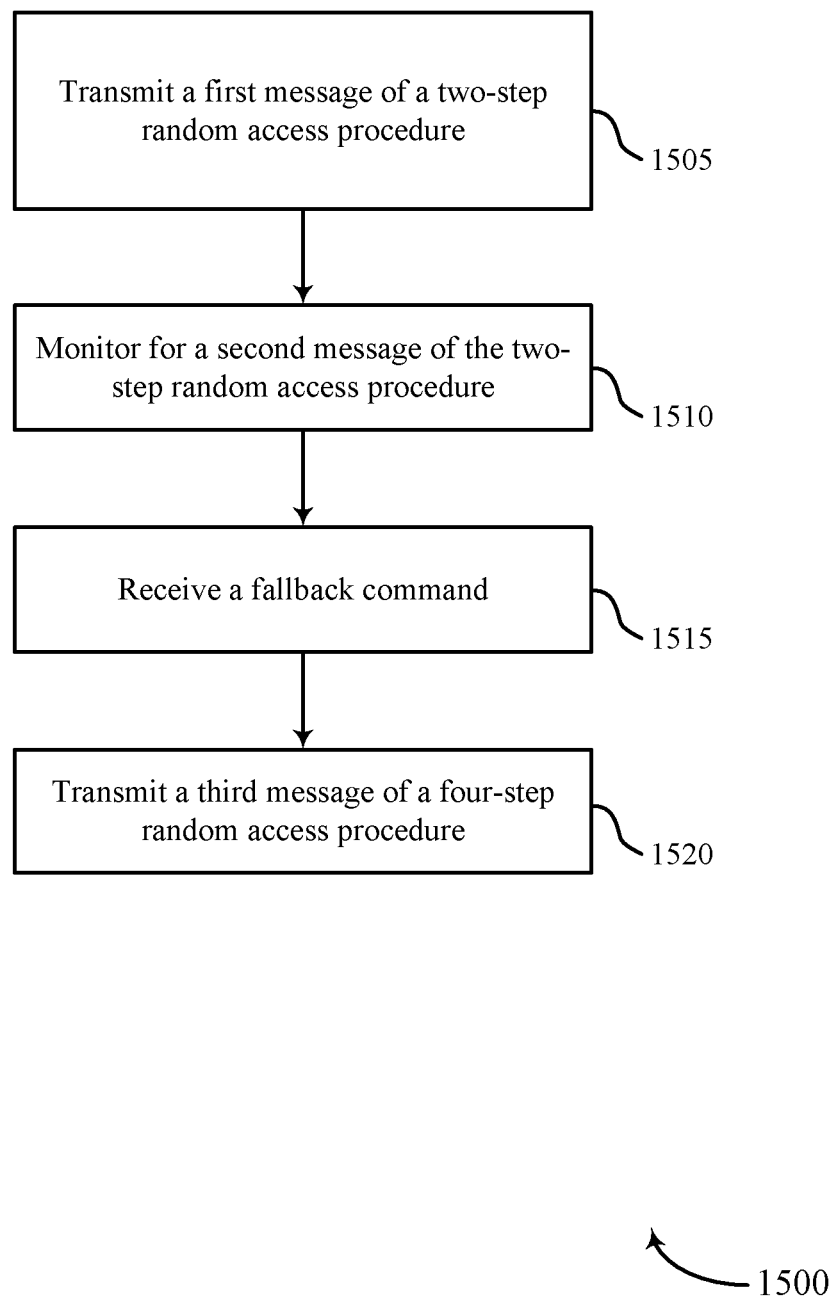

FIG. 15 shows a flowchart illustrating a method 1500 that supports fallback procedures for two-step random access procedures in accordance with aspects of the present disclosure. The operations of method 1500 may be implemented by a UE or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may transmit a first message of a two-step random access procedure to a base station, the first message including a preamble sequence and a data payload. For example, the UE may identify time-frequency resources over which the first message may be transmitted, and the UE may encode and modulate the bits that indicate the first message to transmit the encoded and modulated bits over the identified time-frequency resources. The operations of 1505 may be performed according to the methods described herein. In some examples, aspects of the operations of 1505 may be performed by a random access procedure first message manager as described with reference to FIGS. 7 through 10.

At 1510, the UE may monitor for a second message of the two-step random access procedure from the base station. For example, the UE may identify time-frequency resources over which the second message may be communicated (e.g., from the base station to the UE), and the UE may monitor the identified resource for a transmission for the UE (or an indication of a transmission). The operations of 1510 may be performed according to the methods described herein. In some examples, aspects of the operations of 1510 may be performed by a random access procedure second message manager as described with reference to FIGS. 7 through 10.

At 1515, the UE may receive a fallback command indicating that the UE is to terminate or suspend the two-step random access procedure. For example, the UE may identify time-frequency resources over which the fallback command may be communicated, demodulate the transmission over the time-frequency resources, and decode the demodulated transmission to obtain bits that indicate the fallback command. In some examples, the fallback command may indicate a set of non-contention resources and a transmission scheme (including, e.g., an MCS, a timing advance, power control information, etc.) for the transmitting a third message (e.g., Msg1 or Msg3) of a four-step random access procedure. The operations of 1515 may be performed according to the methods described herein. In some examples, aspects of the operations of 1515 may be performed by a fallback command manager as described with reference to FIGS. 7 through 10.

At 1520, the UE may transmit the third message of the four-step random access procedure to the base station, for example, according to the fallback command if the UE determines based on the monitoring that the base station has not successfully received at least a portion of the first message. The third message may be, for example, Msg1, or a message including at least a portion of, or a retransmission of at least a portion of, the data payload (e.g., Msg3 or an RRC message). For example, the UE may identify time-frequency resources over which the random access message may be transmitted, and the UE may encode and modulate the bits that indicate the random access message to transmit the encoded and modulated bits over the identified time-frequency resources. In some cases, the UE may transmit the third message of the four-step random access procedure based on the fallback command, for example, using the indicated set of non-contention resources for the transmitting a random access message. The operations of 1520 may be performed according to the methods described herein. In some examples, aspects of the operations of 1520 may be performed by a random access procedure third message manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1λ, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, any suitable means adapted to perform the respective function or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of" indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a first message of a two-step random access procedure to a base station, the first message comprising a preamble sequence and a data payload, a last symbol of the preamble sequence and a first symbol of the data payload separated by at least a tuning gap, wherein a configuration for the tuning gap is based at least in part on a first subcarrier spacing of resources used to transmit the preamble sequence or a second subcarrier spacing of resources used to transmit the data payload;
   monitoring for a second message of the two-step random access procedure from the base station; and
   transmitting a third message of a four-step random access procedure to the base station if the UE determines based at least in part on the monitoring that the base station has not successfully received at least a portion of the first message.

2. The method of claim 1, further comprising:
   receiving, based at least in part on the monitoring, the second message of the two-step random access procedure from the base station, the second message comprising at least one of a negative acknowledgement of the data payload, a fallback command, an uplink grant for the third message of the four-step random access procedure, or a combination thereof; and
   wherein the transmitting the third message of the four-step random access procedure comprises transmitting a physical uplink shared channel transmission comprising a retransmission of at least a portion of the data payload in response to receiving the second message of the two-step random access procedure from the base station.

3. The method of claim 1, further comprising:
   receiving a fallback command indicating that the UE is to terminate or suspend the two-step random access procedure; and
   wherein the transmitting the third message of the four-step random access procedure comprises transmitting the third message based at least in part on the fallback command.

4. The method of claim 3, wherein the fallback command is received via one or more of downlink control information, group-common downlink control information, one or more medium access control (MAC) control elements, or a combination thereof.

5. The method of claim 3, further comprising:
   identifying, from a set of fallback indicators in the fallback command, a fallback indicator of whether the UE is to terminate or suspend the two-step random access procedure based at least in part on a type of the data payload.

6. The method of claim 3, wherein the fallback command indicates a number of retransmissions of the first message of the two-step random access procedure prior to terminating or suspending the two-step random access procedure.

7. The method of claim 3, wherein the fallback command indicates a set of non-contention resources and a transmission scheme for the transmitting the third message of the four-step random access procedure.

8. The method of claim 1, further comprising:
   starting a fallback timer upon transmitting the first message of the two-step random access procedure;
   wherein the monitoring comprises monitoring for the second message of the two-step random access procedure based at least in part on the fallback timer; and
   wherein the transmitting the third message of the four-step random access procedure comprises transmitting the third message if the UE determines that the base station has not successfully received the at least the portion of the first message before an expiration of the fallback timer.

9. The method of claim 8, further comprising:
   receiving signaling indicating at least a duration of the fallback timer, wherein the signaling is system information, one or more radio resource control messages, or both.

10. The method of claim 9, wherein the duration of the fallback timer is based at least in part on an associated quality of service, a traffic load, a radio resource control configuration state, a size of the data payload of the first message, or a combination thereof.

11. The method of claim 1, wherein:
    the transmitting the first message comprises transmitting one or more repetitions of the first message of the two-step random access procedure; and
    the transmitting the third message of the four-step random access procedure comprises transmitting the third message if the UE determines that the base station has not successfully received the at least the portion of the one or more of the repetitions of the first message.

12. The method of claim 11, further comprising:
    starting a fallback timer for the UE to monitor for the second message of the two-step random access procedure;
    wherein the monitoring comprises monitoring for the second message of the two-step random access procedure for a duration of the fallback timer; and
    wherein the transmitting the third message of the four-step random access procedure comprises transmitting the third message if the UE determines that the base station has not successfully received the at least the portion of the one or more repetitions of the first message before an expiration of the fallback timer.

13. The method of claim 12, wherein the starting the fallback timer comprises:
    starting the fallback timer upon transmitting a last repetition of the one or more repetitions of the first message.

14. The method of claim 12, wherein the starting the fallback timer comprises:
starting the fallback timer upon transmitting a first repetition of the one or more repetitions of the first message.

15. The method of claim 11, wherein at least one of the repetitions of the first message of the two-step random access procedure is transmitted with a different transmit power from at least one other of the repetitions of the first message of the two-step random access procedure.

16. The method of claim 11, further comprising:
receiving signaling indicating a repetition configuration for the repetitions of the first message of the two-step random access procedure, the repetition configuration indicating a repetition periodicity for periodic repetitions, a repetition pattern for aperiodic repetitions, a resource assignment for one or more of the repetitions, or a combination thereof.

17. The method of claim 11, wherein the monitoring comprises:
monitoring for the second message of the two-step random access procedure after transmitting each of the repetitions of the first message of the two-step random access procedure.

18. The method of claim 11, wherein the transmitting the one or more repetitions of the first message of the two-step random access procedure comprises:
transmitting incremental redundancy information associated with the data payload.

19. The method of claim 18, further comprising:
receiving signaling indicating a hybrid automatic repeat request (HARQ) configuration for the repetitions of the first message of the two-step random access procedure, the HARQ configuration indicating a modulation and coding scheme for the repetitions, preamble sequences for one or more of the repetitions, a transmit power for one or more of the repetitions, a resource assignment for one or more of the repetitions, or a combination thereof.

20. The method of claim 11, further comprising:
updating a counter upon transmitting each of the one or more repetitions of the first message of the two-step random access procedure; and
wherein the transmitting the third message of the four-step random access procedure comprises transmitting the third message if the UE determines that it did not successfully receive the second message of the two-step random access procedure before the counter satisfies a threshold.

21. The method of claim 11, wherein the transmitting the third message of the four-step random access procedure comprises:
transmitting the third message if the UE determines that it did not successfully receive the second message of the two-step random access procedure after retransmitting the first message of the two-step random access procedure using a maximum transmit power, using a maximum number of different preamble sequences, or a combination thereof.

22. The method of claim 11, wherein at least one of the repetitions of the first message of the two-step random access procedure is transmitted with a different preamble sequence from at least one other of the repetitions of the first message of the two-step random access procedure.

23. The method of claim 11, wherein at least one of the repetitions of the first message of the two-step random access procedure is transmitted with a different resource mapping from at least one other of the repetitions of the first message of the two-step random access procedure.

24. The method of claim 1, further comprising:
determining whether to transmit the first message of the two-step random access procedure based at least in part on a signal quality measurement, a signal quality target, an offset value associated with UE overloading, a radio resource control state of the UE, a size of the data payload to be transmitted in the first message, a modulation and coding scheme associated with the first message, an estimated transmit power for a retransmission of the first message, or any combination thereof.

25. The method of claim 1, further comprising:
identifying a plurality of occasions associated with the two-step random access procedure; and
selecting one or more occasions of the plurality of occasions for transmitting the first message of the two-step random access procedure based at least in part on a size of the data payload and respective sizes of each of the plurality of occasions.

26. The method of claim 1, wherein the first message of the two-step random access procedure comprises a preamble, a physical uplink shared channel (PUSCH) comprising the data payload, and a demodulation reference signal (DMRS) associated with the PUSCH.

27. The method of claim 26, further comprising:
performing a first listen-before-talk (LBT) procedure prior to transmitting the preamble of the two-step random access procedure; and
performing a second LBT procedure prior to transmitting the PUSCH and DMRS of the two-step random access procedure.

28. The method of claim 26, wherein the preamble is transmitted via a first set of frequency resources and the PUSCH and DMRS are transmitted via a second, different set of frequency resources.

29. The method of claim 26, wherein the preamble is transmitted via a first beam and the PUSCH and DMRS are transmitted via a second, different beam.

30. The method of claim 1, further comprising:
selecting resources for transmitting the preamble sequence and the data payload in the first message of the two-step random access procedure based at least in part on the tuning gap.

31. The method of claim 1, wherein the transmitting the third message of the four-step random-access procedure comprises:
transmitting one or more repetitions of the third message of the four-step random access procedure.

32. An apparatus for wireless communication at a user equipment (UE), comprising:
a processor,
memory in electronic communication with the processor; and
instructions stored in the memory and executable by the processor to cause the apparatus to:
transmit a first message of a two-step random access procedure to a base station, the first message comprising a preamble sequence and a data payload, a last symbol of the preamble sequence and a first symbol of the data payload separated by at least a tuning gap, wherein a configuration for the tuning gap is based at least in part on a first subcarrier spacing of resources used to transmit the preamble sequence or a second subcarrier spacing of resources used to transmit the data payload;

monitor for a second message of the two-step random access procedure from the base station; and transmit a third message of a four-step random access procedure to the base station if the UE determines based at least in part on the monitoring that the base station has not successfully received at least a portion of the first message.

33. The apparatus of claim 32, wherein the instructions are further executable by the processor to cause the apparatus to:

receive, based at least in part on the monitoring, the second message of the two-step random access procedure from the base station, the second message comprising at least one of a negative acknowledgement of the data payload, a fallback command, an uplink grant for the third message of the four-step random access procedure, or a combination thereof; and wherein the instructions to transmit the third message of the four-step random access procedure are further executable by the processor to transmit a physical uplink shared channel transmission comprising a retransmission of at least a portion of the data payload in response to receiving the second message of the two-step random access procedure from the base station.

34. The apparatus of claim 32, wherein the instructions are further executable by the processor to cause the apparatus to:

receive a fallback command indicating that the UE is to terminate or suspend the two-step random access procedure; and wherein the instructions to transmit the third message of the four-step random access procedure are further executable by the processor to transmit the third message based at least in part on the fallback command.

35. The apparatus of claim 34, wherein the fallback command is received via one or more of downlink control information, group-common downlink control information, one or more medium access control (MAC) control elements, or a combination thereof.

36. The apparatus of claim 34, wherein the instructions are further executable by the processor to cause the apparatus to:

identify, from a set of fallback indicators in the fallback command, a fallback indicator of whether the UE is to terminate or suspend the two-step random access procedure based at least in part on a type of the data payload.

37. The apparatus of claim 34, wherein the fallback command indicates a number of retransmissions of the first message of the two-step random access procedure prior to terminating or suspending the two-step random access procedure.

38. The apparatus of claim 34, wherein the fallback command indicates a set of non-contention resources and a transmission scheme for the transmitting the third message of the four-step random access procedure.

39. The apparatus of claim 32, wherein the instructions are further executable by the processor to cause the apparatus to:

start a fallback timer upon transmitting the first message of the two-step random access procedure;

wherein the instructions to monitor are further executable by the processor to monitor for the second message of the two-step random access procedure based at least in part on the fallback timer; and wherein the instructions to transmit the third message of the four-step random access procedure are further executable by the processor to transmit the third message if the UE determines that the base station has not successfully received the at least the portion of the first message before an expiration of the fallback timer.

40. The apparatus of claim 39, wherein the instructions are further executable by the processor to cause the apparatus to:

receive signaling indicating at least a duration of the fallback timer, wherein the signaling is system information, one or more radio resource control messages, or both.

41. The apparatus of claim 40, wherein the duration of the fallback timer is based at least in part on an associated quality of service, a traffic load, a radio resource control configuration state, a size of the data payload of the first message, or a combination thereof.

42. The apparatus of claim 32, wherein:

the instructions to transmit the first message are further executable by the processor to transmit one or more repetitions of the first message of the two-step random access procedure; and the instructions to transmit the third message of the four-step random access procedure are further executable by the processor to transmit the third message if the UE determines that the base station has not successfully received the at least the portion of the one or more of the repetitions of the first message.

43. The apparatus of claim 42, wherein the instructions are further executable by the processor to cause the apparatus to:

start a fallback timer for the UE to monitor for the second message of the two-step random access procedure;

wherein the instructions to monitoring are further executable by the processor to monitor for the second message of the two-step random access procedure for a duration of the fallback timer; and wherein the instructions to transmit the third message of the four-step random access procedure are further executable by the processor to transmit the third message if the UE determines that the base station has not successfully received the at least the portion of the one or more repetitions of the first message before an expiration of the fallback timer.

44. The apparatus of claim 43, wherein the instructions to start the fallback timer are further executable by the processor to:

start the fallback timer upon transmitting a last repetition of the one or more repetitions of the first message.

45. The apparatus of claim 43, wherein the instructions to start the fallback timer are further executable by the processor to:

start the fallback timer upon transmitting a first repetition of the one or more repetitions of the first message.

46. The apparatus of claim 42, wherein at least one of the repetitions of the first message of the two-step random access procedure is transmitted with a different transmit power from at least one other of the repetitions of the first message of the two-step random access procedure.

47. The apparatus of claim 42, wherein the instructions are further executable by the processor to cause the apparatus to:

receive signaling indicating a repetition configuration for the repetitions of the first message of the two-step random access procedure, the repetition configuration indicating a repetition periodicity for periodic repetitions, a repetition pattern for aperiodic repetitions, a resource assignment for one or more of the repetitions, or a combination thereof.

48. The apparatus of claim 42, wherein the instructions to monitor are further executable by the processor to:
monitor for the second message of the two-step random access procedure after transmitting each of the repetitions of the first message of the two-step random access procedure.

49. The apparatus of claim 42, wherein the instructions to transmit the one or more repetitions of the first message of the two-step random access procedure are further executable by the processor to:
transmit incremental redundancy information associated with the data payload.

50. The apparatus of claim 49, wherein the instructions are further executable by the processor to cause the apparatus to:
receive signaling indicating a hybrid automatic repeat request (HARQ) configuration for the repetitions of the first message of the two-step random access procedure, the HARQ configuration indicating a modulation and coding scheme for the repetitions, preamble sequences for one or more of the repetitions, a transmit power for one or more of the repetitions, a resource assignment for one or more of the repetitions, or a combination thereof.

51. The apparatus of claim 42, wherein the instructions are further executable by the processor to cause the apparatus to:
update a counter upon transmitting each of the one or more repetitions of the first message of the two-step random access procedure; and
wherein the instructions to transmit the third message of the four-step random access procedure are further executable by the processor to transmit the third message if the UE determines that it did not successfully receive the second message of the two-step random access procedure before the counter satisfies a threshold.

52. The apparatus of claim 42, wherein the instructions to transmit the third message of the four-step random access procedure are further executable by the processor to:
transmit the third message if the UE determines that it did not successfully receive the second message of the two-step random access procedure after retransmitting the first message of the two-step random access procedure using a maximum transmit power, using a maximum number of different preamble sequences, or a combination thereof.

53. The apparatus of claim 42, wherein at least one of the repetitions of the first message of the two-step random access procedure is transmitted with a different preamble sequence from at least one other of the repetitions of the first message of the two-step random access procedure.

54. The apparatus of claim 42, wherein at least one of the repetitions of the first message of the two-step random access procedure is transmitted with a different resource mapping from at least one other of the repetitions of the first message of the two-step random access procedure.

55. The apparatus of claim 32, wherein the instructions are further executable by the processor to cause the apparatus to:
determine whether to transmit the first message of the two-step random access procedure based at least in part on a signal quality measurement, a signal quality target, an offset value associated with UE overloading, a radio resource control state of the UE, a size of the data payload to be transmitted in the first message, a modulation and coding scheme associated with the first message, an estimated transmit power for a retransmission of the first message, or any combination thereof.

56. The apparatus of claim 32, wherein the instructions are further executable by the processor to cause the apparatus to:
identify a plurality of occasions associated with the two-step random access procedure; and
select one or more occasions of the plurality of occasions for transmitting the first message of the two-step random access procedure based at least in part on a size of the data payload and respective sizes of each of the plurality of occasions.

57. The apparatus of claim 32, wherein the first message of the two-step random access procedure comprises a preamble, a physical uplink shared channel (PUSCH) comprising the data payload, and a demodulation reference signal (DMRS) associated with the PUSCH.

58. The apparatus of claim 57, wherein the instructions are further executable by the processor to cause the apparatus to:
perform a first listen-before-talk (LBT) procedure prior to transmitting the preamble of the two-step random access procedure; and
perform a second LBT procedure prior to transmitting the PUSCH and DMRS of the two-step random access procedure.

59. The apparatus of claim 57, wherein the preamble is transmitted via a first set of frequency resources and the PUSCH and DMRS are transmitted via a second, different set of frequency resources.

60. The apparatus of claim 57, wherein the preamble is transmitted via a first beam and the PUSCH and DMRS are transmitted via a second, different beam.

61. The apparatus of claim 32, wherein the instructions are further executable by the processor to cause the apparatus to:
select resources for transmitting the preamble sequence and the data payload in the first message of the two-step random access procedure based at least in part on the tuning gap.

62. The apparatus of claim 32, wherein the instructions to transmit the third message of the four-step random access procedure are further executable by the processor to:
transmit one or more repetitions of the third message of the four-step random access procedure.

63. An apparatus for wireless communication at a user equipment (UE), comprising:
means for transmitting a first message of a two-step random access procedure to a base station, the first message comprising a preamble sequence and a data payload, a last symbol of the preamble sequence and a first symbol of the data payload separated by at least a tuning gap, wherein a configuration for the tuning gap is based at least in part on a first subcarrier spacing of resources used to transmit the preamble sequence or a second subcarrier spacing of resources used to transmit the data payload;
means for monitoring for a second message of the two-step random access procedure from the base station; and
means for transmitting a third message of a four-step random access procedure to the base station if the UE determines based at least in part on the monitoring that the base station has not successfully received at least a portion of the first message.

64. A non-transitory computer-readable medium storing code for wireless communication at a user equipment (UE), the code comprising instructions executable by a processor to:

transmit a first message of a two-step random access procedure to a base station, the first message comprising a preamble sequence and a data payload, a last symbol of the preamble sequence and a first symbol of the data payload separated by at least a tuning gap, wherein a configuration for the tuning gap is based at least in part on a first subcarrier spacing of resources used to transmit the preamble sequence or a second subcarrier spacing of resources used to transmit the data payload;

monitor for a second message of the two-step random access procedure from the base station; and transmit a third message of a four-step random access procedure to the base station if the UE determines based at least in part on the monitoring that the base station has not successfully received at least a portion of the first message.

\* \* \* \* \*